US011461444B2

United States Patent
Yi et al.

(10) Patent No.: US 11,461,444 B2
(45) Date of Patent: Oct. 4, 2022

(54) INFORMATION PROCESSING METHOD AND DEVICE BASED ON INTERNET OF THINGS

(71) Applicant: ADVANCED NEW TECHNOLOGIES CO., LTD., Grand Cayman (KY)

(72) Inventors: Yang Yi, Hangzhou (CN); Lei Cao, Hangzhou (CN); Rong Wang, Hangzhou (CN); Feng Lin, Hangzhou (CN); Huanmi Yin, Hangzhou (CN); Xiaodong Zeng, Hangzhou (CN); Li Chen, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 223 days.

(21) Appl. No.: 16/586,796

(22) Filed: Sep. 27, 2019

(65) Prior Publication Data

US 2020/0026839 A1   Jan. 23, 2020

Related U.S. Application Data

(63) Continuation of application No. PCT/CN2018/080522, filed on Mar. 26, 2018.

(30) Foreign Application Priority Data

Mar. 31, 2017  (CN) .................... 201710211340.2

(51) Int. Cl.
  *G06F 21/32*   (2013.01)
  *G06Q 20/32*   (2012.01)
  *G06Q 20/40*   (2012.01)

(52) U.S. Cl.
  CPC .......... *G06F 21/32* (2013.01); *G06Q 20/325* (2013.01); *G06Q 20/40145* (2013.01)

(58) Field of Classification Search
  CPC .............. H04L 63/0861; H04L 9/3231; H04L 2209/56; H04L 9/321; H04L 9/3273;
  (Continued)

(56) References Cited

U.S. PATENT DOCUMENTS 8,538,011 B2   9/2013   Moskowitz
9,143,504 B1   9/2015   Shi et al.
(Continued)

FOREIGN PATENT DOCUMENTS

CN      1860724 A       11/2006
CN      101673329 A      3/2010
(Continued)

OTHER PUBLICATIONS

"Research team develops ultrathin, transparent oxide thin-film transistors for wearable display", The Korea Advanced Institute of Science and Technology (KAIST), Science X, Jul. 29, 2016, retrieved from: https://phys.org/news/2016-07-team-ultrathin-transparent-oxide-thin-film.html on Oct. 30, 2019 (3 pages).
(Continued)

*Primary Examiner* — Saleh Najjar
*Assistant Examiner* — Khalid M Almaghayreh

(57) ABSTRACT

Embodiments of the application provide information processing systems, methods and devices based on Internet of Things. An information processing system comprises a server device, a first device and a second device. The first device and second device are both an Internet of Things device. The first device is configured to: in response to detecting that a first acquisition instruction is triggered, acquire biometric feature information, and send the acquired biometric feature information to the server device. The
(Continued)

server device is configured to identify a user corresponding to the biometric feature information. The second device is configured to: in response to detecting that a second acquisition instruction is triggered, acquire body movement information associated with the user, and send the acquired body movement information to the server device. The server device is further configured to perform an operation for the user according to the body movement information.

18 Claims, 19 Drawing Sheets

(58) Field of Classification Search
CPC . H04L 63/08; H04L 63/0869; H04L 63/0853; G06F 21/32; G06F 21/34; G06F 2221/2129; G06F 16/381; G06F 21/445; G06F 3/011; G06F 21/35; G06F 21/31; H04W 12/06
See application file for complete search history.

(56) References Cited

U.S. PATENT DOCUMENTS

| | | | |
|---|---|---|---|
| 9,147,296 | B2 | 9/2015 | Ricci |
| 9,329,689 | B2 | 5/2016 | Osterhout et al. |
| 9,386,401 | B2 | 7/2016 | Gold |
| 9,600,571 | B2* | 3/2017 | Shaashua .............. H04L 67/12 |
| 9,849,364 | B2 | 12/2017 | Tran et al. |
| 10,140,820 | B1 | 11/2018 | Zalewski et al. |
| 10,223,710 | B2 | 3/2019 | Purves et al. |
| 10,262,126 | B2 | 4/2019 | Tussy |
| 10,425,414 | B1* | 9/2019 | Buckingham ............ G06F 8/61 |
| 10,528,711 | B2 | 1/2020 | Lee et al. |
| 10,534,900 | B2 | 1/2020 | Cheong et al. |
| 10,643,444 | B2* | 5/2020 | Kim ...................... H04L 67/12 |
| 2005/0071647 | A1 | 3/2005 | Fujinuma et al. |
| 2005/0102502 | A1 | 5/2005 | Sagen |
| 2006/0182346 | A1 | 8/2006 | Yoda et al. |
| 2007/0101154 | A1* | 5/2007 | Bardsley ................ H04L 63/04 |
| | | | 713/186 |
| 2014/0139422 | A1 | 5/2014 | Mistry et al. |
| 2014/0289323 | A1 | 9/2014 | Kutaragi et al. |
| 2014/0337221 | A1 | 11/2014 | Hoyos |
| 2014/0337948 | A1 | 11/2014 | Hoyos |
| 2014/0337949 | A1 | 11/2014 | Hoyos |
| 2014/0342818 | A1* | 11/2014 | Smith .................... A63F 13/42 |
| | | | 463/29 |
| 2015/0035643 | A1* | 2/2015 | Kursun .................. G07C 9/32 |
| | | | 340/5.82 |
| 2015/0170446 | A1 | 6/2015 | Burba et al. |
| 2015/0180866 | A1* | 6/2015 | Hama ................. G06V 40/1365 |
| | | | 726/6 |
| 2015/0310444 | A1 | 10/2015 | Chen et al. |
| 2015/0324568 | A1 | 11/2015 | Publicover et al. |
| 2015/0326570 | A1 | 11/2015 | Publicover et al. |
| 2015/0347732 | A1 | 12/2015 | Alameh et al. |
| 2016/0063235 | A1 | 3/2016 | Tussy |
| 2016/0063315 | A1* | 3/2016 | Lim ..................... B60Q 1/04 |
| | | | 348/77 |
| 2016/0065653 | A1* | 3/2016 | Chen .................. H04L 41/0813 |
| | | | 715/735 |
| 2016/0070898 | A1* | 3/2016 | Kwok-Suzuki ....... G06F 21/316 |
| | | | 726/7 |
| 2016/0196417 | A1 | 7/2016 | Tokunaga et al. |
| 2016/0291553 | A1 | 10/2016 | Hsu |
| 2016/0321368 | A1* | 11/2016 | Wang ................ G06Q 30/0625 |
| 2016/0375306 | A1 | 12/2016 | Gu et al. |
| 2017/0011406 | A1 | 1/2017 | Tunnell et al. |
| 2017/0060298 | A1 | 3/2017 | Hwang et al. |
| 2017/0345420 | A1 | 11/2017 | Barnett, Jr. |
| 2018/0034655 | A1* | 2/2018 | Christopher ............ G06F 3/048 |
| 2018/0183874 | A1* | 6/2018 | Cook .................... H04L 41/145 |
| 2018/0233147 | A1* | 8/2018 | Tukka .................... G10L 15/22 |
| 2018/0242149 | A1* | 8/2018 | Verma .................... H04L 63/08 |
| 2018/0247037 | A1* | 8/2018 | Weller .................... G06F 21/32 |
| 2020/0167450 | A1* | 5/2020 | Li ........................ H04L 63/0876 |

FOREIGN PATENT DOCUMENTS

| | | |
|---|---|---|
| CN | 102968612 A | 3/2013 |
| CN | 103825745 A | 5/2014 |
| CN | 103869785 A | 6/2014 |
| CN | 104537746 A | 4/2015 |
| CN | 104660618 A | 5/2015 |
| CN | 104868997 A | 8/2015 |
| CN | 104992141 A | 10/2015 |
| CN | 105389490 A | 3/2016 |
| CN | 205176908 U | 4/2016 |
| CN | 105938526 A | 9/2016 |
| CN | 105975081 A | 9/2016 |
| CN | 105984523 A | 10/2016 |
| CN | 105991652 A | 10/2016 |
| CN | 106028284 A | 10/2016 |
| CN | 106054620 A | 10/2016 |
| CN | 106267776 A | 1/2017 |
| CN | 107391983 A | 11/2017 |
| EP | 2990997 A2 | 3/2016 |
| JP | 2005-71225 A | 3/2005 |
| JP | 2010-177825 A | 8/2010 |
| JP | 2014-26482 A | 2/2014 |
| JP | 2015-50640 A | 3/2015 |
| JP | 2015-60384 A | 3/2015 |
| JP | 2015-94961 A | 5/2015 |
| JP | 2015-121904 A | 7/2015 |
| JP | 2016-524751 A | 8/2016 |
| JP | 2016-212826 A | 12/2016 |
| JP | 2017-502387 A | 1/2017 |
| KR | 10-2016-0135410 A | 11/2016 |
| TW | M518180 U | 3/2016 |
| WO | 03/025859 A1 | 3/2003 |

OTHER PUBLICATIONS

Langston, "Secure passwords can be sent through your body, instead of air," University of Washington, Sep. 27, 2016, retrieved from: https://www.washington.edu/news/2016/09/27/secure-passwords-can-be-sent-through-your-body-instead-of-air/ on Oct. 30, 2019 (5 pages).
First Search for Chinese Application No. 201710211340.2 dated Sep. 30, 2019 (1 page).
First Office Action for Chinese Application No. 201710211340.2 dated Oct. 16, 2019 with English machine translation (143 pages).
Non-Final rejection and Search Report for Taiwanese Application No. 106140508 dated Jul. 2, 2019 (46 pages).
Written Opinion of the International Searching Authority and International Search Report for PCT Application No. PCT/CN2018/080522 dated May 4, 2018 (14 pages).
International Preliminary Report on Patentability Chapter I for PCT Application No. PCT/CN2018/080522 dated Oct. 10, 2019 (12 pages).
UnifyID, retrieved from: https://unify.id/, retrieved on Nov. 11, 2019 (3 pages).
Search Report for European Application No. 187781091.1 dated Mar. 20, 2020.
Examination Report for European Application No. 187781091.1 dated Apr. 6, 2020.
Partial Supplementary Search Report for European Application No. 187781091.1 dated Dec. 18, 2019 (12 pages).
Written Opinion for Singaporean Application No. 11201908565P dated Feb. 1, 2021.
Supplementary Search for Chinese Application No. 201710211340.2 dated Sep. 8, 2020.
Office Action for Japanese Application No. 2019-553479 dated Jun. 8, 2021.

(56) References Cited

OTHER PUBLICATIONS

Office Action for Korean Application No. 10-2019-7029475 dated Apr. 29, 2021.

* cited by examiner

INFORMATION PROCESSING METHOD AND DEVICE BASED ON INTERNET OF THINGS

CROSS-REFERENCE TO RELATED APPLICATIONS

The present application is a continuation application of International Patent Application No. PCT/CN2018/080522, filed on Mar. 26, 2018, which is based on and claims priority to the Chinese Patent Application No. 201710211340.2, filed on Mar. 31, 2017 and entitled "INFORMATION PROCESSING METHOD AND DEVICE BASED ON INTERNET OF THINGS." The above-referenced applications are incorporated herein by reference in their entirety.

TECHNICAL FIELD

The application relates to the field of computer technologies, and in particular, to an information processing method and device based on Internet of Things in the field of computer.

BACKGROUND

With the development of information technologies, a user has already been enabled to perform various operations, such as social networking, payment, etc., by using a mobile terminal. A key step in allowing a user to perform these operations by using a mobile terminal is performing identity authentication of the user through the mobile terminal.

Currently, a user still needs to carry along a mobile terminal for implementing the foregoing identity authentication. Once the mobile terminal is lost or stolen, not only the user cannot perform the foregoing operations, but also the user's private information stored in the mobile terminal and used for the identity authentication may be obtained by others, causing loss to the user.

Therefore, the methods for performing an operation by using a mobile terminal for a user in the existing technologies are not sufficiently convenient and safe.

SUMMARY

Embodiments of the specification provide a resource transmission method and device, to resolve a problem in existing technologies that resource obtaining is inconvenient based on a combination of augmented reality and positioning service.

Both a first device and a second device described in the specification may be Internet of Things devices. In some embodiments, the first device and the second device may be devices other than mobile terminal devices. The first device and the second device described in the specification may be the same device, or may be different devices.

Some embodiments of the specification provide an information processing method implementable by a computing device. The method includes: receiving biometric feature information from a first device, wherein the first device is an Internet of Things device; identifying, according to the biometric feature information, a user corresponding to the biometric feature information; receiving body movement information associated with the user from a second device, wherein the second device is an Internet of Things device; and performing an operation for the user according to the body movement information.

In some embodiments, the identifying, according to the biometric feature information, a user corresponding to the biometric feature information comprises: for each type of received biometric feature information, determining a similarity between the biometric feature information and each prestored biometric feature sample; determining, according to the determined similarity, a biometric feature sample that matches the biometric feature information; and determining, according to a correspondence between each prestored biometric feature samples and a user, a user corresponding to the biometric feature sample that matches the biometric feature information; and in response to detecting that in users respectively determined based on a plurality of types of the received biometric feature information, more than a set quantity or a set ratio of the users are the same user, determining that the same user is an identification result.

In some embodiments, the performing an operation for the user according to the body movement information comprises: determining, according to a prestored correspondence between the second device and body movement information, pieces of body movement information corresponding to the second device; determining body movement information that matches the received body movement information in the determined pieces of body movement information; and performing, according to a prestored correspondence for the second device and between each piece of body movement information and an operation, an operation corresponding to the body movement information that matches the received body movement information for the user.

In some embodiments, the method further comprises: determining, according to the identified user, whether the user is an authorized user; and in response to determining that the user is an authorized user, triggering a second acquisition instruction of the second device bound with the first device, for the second device to acquire the body movement information.

In some embodiments, the method further comprises: receiving voice information from a voice device bound with the first device, wherein the voice device is an Internet of Things device; identifying, according to voiceprint feature information comprised in the voice information from the voice device, a user corresponding to the voiceprint feature information; and in response to detecting that the user corresponding to the biometric feature information and the user corresponding to the voiceprint feature information are the same user, determining the same user as an identification result.

In some embodiments, the method further comprises: receiving voice information from a voice device bound with the first device; recognizing semantics in the voice information; and performing the operation for the user according to the body movement information and the semantics recognized from the voice information.

In some embodiments, the method further comprises: receiving vital sign information from a vital sign detection device bound with the first device; determining information or an operation to be recommended to the user according to the received vital sign information and a stored recommendation rule; and sending the determined information or operation to the display device for displaying.

In some embodiments, the method further comprises: receiving biometric feature information acquired by a human body chip and/or a digital certificate stored in the human body chip that is from the first device; identifying, by the server device, a user corresponding to the biometric feature information acquired by the first device and a user corresponding to the biometric feature information acquired by the human body chip and/or the digital certificate stored in the human body chip; and in response to detecting that the user corresponding to the biometric feature information acquired by the first device and the user corresponding to the biometric feature information acquired by the human body chip and/or the digital certificate stored in the human body chip are the same user, determining the same user as an identification result.

Some embodiments of the specification provide an information processing server. The Information processing server comprises one or more processors and one or more non-transitory computer-readable memories coupled to the one or more processors and configured with instructions executable by the one or more processors to cause the server to perform: receiving biometric feature information from a first device, wherein the first device is an Internet of Things device; identifying, according to the biometric feature information, a user corresponding to the biometric feature information; receiving body movement information associated with the user from a second device, wherein the second device is an Internet of Things device; and performing an operation for the user according to the body movement information.

Some embodiments of the specification provide a payment method, implementable by a computing device. The payment method comprises: receiving biometric feature information and body movement information; identifying, according to the biometric feature information, a user in a shop; obtaining a body movement identification template, wherein the body movement identification template indicates correspondence between a product and a body movement of a user; identifying, according to the body movement information and the body movement identification template, a product obtained by the user in the shop, and recording the product; and in response to receiving biometric feature information acquired and sent by an exit device of the shop, identifying, according to the biometric feature information sent by the exit device, that the user leaves the shop, and performing, according to a recorded product obtained by the user who leaves the shop, a payment operation for the user who leaves the shop.

In some embodiments, the body movement identification template further indicates a location of the user, a type of the body movement of the user, and an object orientation corresponding to the body movement of the user, and wherein identifying, according to the body movement information and the body movement identification template, a product obtained by the user in the shop comprises: determining the product obtained by the user based on the location of the user, the type of the body movement of the user, and the object orientation corresponding to the body movement of the user.

In some embodiments, before the identifying, according to the biometric feature information, a user in a shop, the method further comprises: receiving biometric feature information acquired and sent by an entrance device of the shop; identifying, according to the biometric feature information acquired and sent by the entrance device, users who enter the shop; and wherein identifying, according to the biometric feature information, a user in a shop comprises: identifying, according to the biometric feature information of the users who enter the shop and the biometric feature information, the user corresponding to the biometric feature information in the users who enter the shop; and wherein identifying, according to the biometric feature information sent by the exit device, that the user leaves the shop comprises: identifying, according to the biometric feature information of the users who enter the shop and the biometric feature information sent by the exit device, a user corresponding to the biometric feature information sent by the exit device in the users who enter the shop, as the identified user who leaves the shop.

Some embodiments of the specification provide an information processing system based on Internet of Things. The system includes a server device, a first device and a second device. The first device and the second device each are an Internet of Things device. The first device is configured to: in response to detecting that a first acquisition instruction is triggered, acquire biometric feature information, and send the acquired biometric feature information to the server device; the server device is configured to: receive the biometric feature information sent by the first device, and identify, according to the biometric feature information, a user corresponding to the biometric feature information; the second device is configured to: in response to detecting that a second acquisition instruction is triggered, acquire body movement information associated with the user, and send the acquired body movement information to the server device; and the server device is further configured to: receive the body movement information sent by the second device, and perform an operation for the user according to the body movement information.

In some embodiments, the first device and the second device are the same device.

In some embodiments, the first device and the second device have a binding relationship; and the first device is further configured to: receive an identification result obtained by identifying the user according to the biometric feature information by the server device, and determine, according to the identification result, whether to trigger the second acquisition instruction of the second device bound with the first device.

In some embodiments, the first device and the second device have a binding relationship; and the server device is further configured to: after identifying the user according to the biometric feature information, determine, according to an identification result, whether to trigger the second acquisition instruction of the second device bound with the first device.

In some embodiments, the system further comprises a voice device, and the voice device is an Internet of Things device; the voice device is configured to: acquire voice information, and send the acquired voice information to the server device; and the server device is further configured to: receive the voice information sent by the voice device, and identify the user according to the biometric feature information and voiceprint feature information comprised in the voice information.

In some embodiments, the system further comprises a voice device, and the voice device is an Internet of Things device; the voice device is configured to: acquire voice information, and send the acquired voice information to the server device; and the server device is configured to: receive the voice information sent by the voice device, recognize semantics in the voice information, and perform the operation for the user according to the body movement information and the semantics recognized from the voice information.

In some embodiments, the server device is configured to return corresponding reply information to the voice device according to the semantics recognized from the voice information; and the voice device is further configured to receive and play the reply information.

In some embodiments, the system further comprises a display device; the server device is further configured to return response information to the display device according to the biometric feature information and/or the body movement information; and the display device is configured to receive and display the response information.

In some embodiments, the system further comprises a vital sign detection device; the vital sign detection device is configured to: acquire vital sign information of the user, and send the vital sign information to the server device; and the server device is further configured to: receive the vital sign information; determine, according to the vital sign information and a recommendation rule, information or an operation to be recommended to the user; and send the determined information or operation to the display device for displaying.

In some embodiments, the system further comprises a human body chip; the human body chip is configured to: acquire biometric feature information, and send, to the first device, the acquired biometric feature information and/or a digital certificate that uniquely corresponds to the user and that is stored in the human body chip; the first device is further configured to send to the server device the biometric feature information and/or the digital certificate from the human body chip; and the server device is further configured to identify the user according to the biometric feature information acquired by the first device, and the biometric feature information acquired by the human body chip and/or the digital certificate stored in the human body chip.

Some embodiments of the specification provide an information processing method, including: monitoring whether a first acquisition instruction is triggered; in response to detecting that the first acquisition instruction is triggered, acquiring biometric feature information; and sending the acquired biometric feature information to a server device, for the server device to identify a user corresponding to the biometric feature information.

Some embodiments of the specification provide an information processing method, including: monitoring, by a second device, whether a second acquisition instruction of the second device is triggered; when it is detected that the second acquisition instruction is triggered, acquiring body movement information; and sending the acquired body movement information to a server device, for the server device to perform an operation for a user.

Some embodiments of the specification provide an information processing method, including: acquiring, by a human body chip, biometric feature information of a user; and sending the acquired biometric feature information and/or a digital certificate stored in the human body chip to a first device, for the first device to send biometric feature information acquired by the first device, and the biometric feature information acquired by the human body chip and/or the digital certificate stored in the human body chip to a server device for identification.

Some embodiments of the specification provide an information recommendation method, including: receiving, by a server device, biometric feature information sent by a first device and vital sign information sent by a vital sign detection device; identifying, according to the biometric feature information, a user corresponding to the biometric feature information; determining, according to the vital sign information and a stored recommendation rule, information and/or an operation to be recommended to the user; and sending the determined information and/or operation to a display device for displaying.

Some embodiments of the specification provide a bicycle unlocking method, including: receiving, by a server device, biometric feature information acquired and sent by a first acquisition unit on a bicycle and body movement information acquired and sent by a second acquisition unit on the bicycle; identifying, according to the biometric feature information sent by the first acquisition unit, a user corresponding to the biometric feature information; and when identifying, according to the body movement information, that the body movement information is a specified body movement, performing a payment operation according to an account corresponding to the user, and controlling to unlock a lock of the bicycle.

Some embodiments of the specification provide a payment method, including: receiving, by a server device, biometric feature information acquired and sent by a first acquisition unit on a shelf of a shop and body movement information acquired and sent by a second acquisition unit on the shelf; identifying, according to the biometric feature information sent by the first acquisition unit on the shelf, a user corresponding to the biometric feature information; identifying, according to the body movement information, a product obtained by the user from the shelf, and recording the product; and when receiving biometric feature information acquired and sent by an exit device, identifying, by the server device and according to the biometric feature information sent by the exit device, a user who leaves the shop, and performing, according to a recorded product obtained by the user who leaves the shop, a payment operation for the user who leaves the shop.

Some embodiments of the specification provide an ordering method, including: receiving, by a server device, biometric feature information acquired and sent by a first acquisition unit on a dining table and body movement information acquired and sent by a second acquisition unit on the dining table; identifying, according to the biometric feature information sent by the first acquisition unit, a user corresponding to the biometric feature information; identifying, according to the body movement information, a dish selected by the user from dishes displayed on a display component on the dining table; and performing an ordering operation for the user according to the identified dish selected by the user.

Some embodiments of the specification provide a turnstile control method, including: receiving, by a server device, biometric feature information acquired and sent by a first acquisition unit on a turnstile and first body movement information acquired and sent by a second acquisition unit on the turnstile; identifying, according to the biometric feature information sent by the first acquisition unit, a user corresponding to the biometric feature information; and when detecting, according to the first body movement information sent by the second acquisition unit, that a first body movement of the user satisfies a specified condition, determining whether there is a ticket purchase record of the user; and if yes, controlling the turnstile to be open; or if not, controlling the turnstile not to be open.

Some embodiments of the specification provide an information processing device, including a communication interface and a processor, where the communication interface is configured to receive biometric feature information sent by a first device; and the processor is configured to identify, according to the biometric feature information, a user corresponding to the biometric feature information, where the first device is an Internet of Things device.

Some embodiments of the specification provide an information processing device, the device is an Internet of Things device, and the device includes an acquisition unit, a processor, and a communication interface, where the processor is configured to: monitor whether a first acquisition instruction is triggered; when it is detected that the first acquisition instruction is triggered, control the acquisition unit to acquire biometric feature information, receive the biometric feature information acquired by the acquisition unit; and send the acquired biometric feature information to a server device by using the communication interface, for the server device to identify a user corresponding to the biometric feature information; the acquisition unit is configured to: acquire the biometric feature information, and return the biometric feature information to the processor; and the communication interface is configured to send the biometric feature information to the server device.

Some embodiments of the specification provide an information processing device, the device is an Internet of Things device, and the device includes an acquisition unit, a processor, and a communication interface, where the processor is configured to: monitor whether a second acquisition instruction is triggered; when detecting that the second acquisition instruction is triggered, control the acquisition unit to acquire body movement information; and send the acquired body movement information to a server device by using the communication interface, for the server device to perform an operation for a user; the acquisition unit is configured to: acquire the body movement information, and send the acquired body movement information to the processor; and the communication interface is configured to send the body movement information to the server device.

Some embodiments of the specification provide a human body chip, and the human body chip includes an acquisition unit, a memory, and a communication interface, where the acquisition unit is configured to acquire biometric feature information of a user; the memory is configured to store a digital certificate; and the communication interface is configured to: send the biometric feature information acquired by the acquisition unit and/or the digital certificate stored in the memory to the first device, for the first device to send biometric feature information acquired by the first device, and the biometric feature information acquired by the human body chip and/or the digital certificate stored in the human body chip to a server device for identification.

Some embodiments of the specification provide an information recommendation device, including a communication interface and a processor, where the processor is configured to: receive, by using the communication interface, biometric feature information sent by a first device and vital sign information sent by a vital sign detection device; identify, according to the biometric feature information, a user corresponding to the biometric feature information; determine, according to the vital sign information and a stored recommendation rule, information and/or an operation to be recommended to the user; and send the determined information and/or operation to a display device by using the communication interface for displaying; and the communication interface is configured to: receive the biometric feature information sent by the first device and the vital sign information sent by the vital sign detection device; and send the information and/or operation determined by the processor to the display device for displaying.

Some embodiments of the specification provide a bicycle unlocking device, including a communication interface and a processor, where the processor is configured to: receive, by using the communication interface, biometric feature information acquired and sent by a first acquisition unit on a bicycle and body movement information acquired and sent by a second acquisition unit on the bicycle; identify, according to the biometric feature information sent by the first acquisition unit, a user corresponding to the biometric feature information; and when identifying, according to the body movement information, that the body movement information is a specified body movement, perform a payment operation according to an account corresponding to the user, and control to unlock a lock of the bicycle; and the communication interface is configured to receive the biometric feature information acquired and sent by the first acquisition unit on the bicycle and the body movement information acquired and sent by the second acquisition unit on the bicycle.

Some embodiments of the specification provide a bicycle, including a first acquisition unit, a second acquisition unit, a processor, a communication interface, and a lock, where the processor is configured to: when a first acquisition instruction is triggered, acquire biometric feature information by using the first acquisition unit, and send the biometric feature information to a server device by using the communication interface; when a second acquisition instruction is triggered, acquire body movement information by using the second acquisition unit, and send the body movement information to the server device by using the communication interface; and unlock the lock when receiving, by using the communication interface, an unlocking instruction returned by the server device; the first acquisition unit is configured to: acquire the biometric feature information, and send the acquired biometric feature information to the processor; the second acquisition unit is configured to: acquire the body movement information, and send the acquired body movement information to the processor; and the communication interface is configured to: send the biometric feature information to the server device, send the body movement information to the server device, and receive the unlocking instruction returned by the server device.

The first acquisition unit and the second acquisition unit on the bicycle may be a same acquisition unit, or may be different acquisition units.

Some embodiments of the specification provide a payment device, including a processor and a communication interface, where the processor is configured to: receive, by using the communication interface, biometric feature information acquired and sent by a first acquisition unit on a shelf of a shop and body movement information acquired and sent by a second acquisition unit on the shelf; identify, according to the biometric feature information sent by the first acquisition unit on the shelf, a user corresponding to the biometric feature information; identify, according to the body movement information, a product obtained by the user from the shelf, and record the product; and when receiving, by using the communication interface, biometric feature information acquired and sent by an exit device, identify, according to the biometric feature information sent by the exit device, a user who leaves the shop, and perform, according to the recorded product obtained by the user who leaves the shop, a payment operation for the user who leaves the shop; and the communication interface is configured to: receive the biometric feature information acquired and sent by the first acquisition unit on the shelf of the shop and the body movement information acquired and sent by the second acquisition unit on the shelf, and receive the biometric feature information acquired and sent by the exit device.

Some embodiments of the specification provide a shelf, including a first acquisition unit, a second acquisition unit, a processor, and a communication interface, where the processor is configured to: when a first acquisition instruction is triggered, acquire biometric feature information by using the first acquisition unit; when a second acquisition instruction is triggered, acquire body movement information by using the second acquisition unit; and send, by using the communication interface, the biometric feature information and the body movement information to a server device, for the server device to identify a product obtained by a user corresponding to the biometric feature information from the shelf; the first acquisition unit is configured to: acquire the biometric feature information, and send the biometric feature information to the processor; the second acquisition unit is configured to: acquire the body movement information, and send the body movement information to the processor; and the communication interface is configured to: send the biometric feature information and the body movement information to the server device.

The first acquisition unit and the second acquisition unit on the shelf may be a same acquisition unit, or may be different acquisition units.

Some embodiments of the specification provide an exit device, including a first acquisition unit, a processor, and a communication interface, where the processor is configured to: when a first acquisition instruction is triggered, acquire biometric feature information by using the first acquisition unit, and send the biometric feature information to a server device by using the communication interface, for the server device to identify, according to the biometric feature information, a user who leaves a shop, and performs, according to a recorded product obtained by the user who leaves the shop, a payment operation for the user who leaves the shop; the first acquisition unit is configured to: acquire the biometric feature information of the user, and send the biometric feature information to the processor; and the communication interface is configured to send the biometric feature information to the server device.

Some embodiments of the specification provide an entrance device, including a first acquisition unit, a processor, and a communication interface, where the processor is configured to: when a first acquisition instruction is triggered, acquire biometric feature information by using the first acquisition unit, and send the biometric feature information to a server device by using the communication interface, for the server device to identify users who enter a shop; when receiving biometric feature information sent by a shelf, identify a user corresponding to the biometric feature information sent by the shelf in the users who enter the shop; and when receiving biometric feature information sent by an exit device, identify a user who leaves the shop in the users who enter the shop; the first acquisition unit is configured to: acquire the biometric feature information, and send the acquired biometric feature information to the processor; and the communication interface is configured to send the biometric feature information acquired by the first acquisition unit to the server device.

Some embodiments of the specification provide an ordering device, including a communication interface and a processor, where the processor is configured to: receive, by using the communication interface, biometric feature information acquired and sent by a first acquisition unit on a dining table and body movement information acquired and sent by a second acquisition unit on the dining table; identify, according to the biometric feature information sent by the first acquisition unit, a user corresponding to the biometric feature information; identify, according to the body movement information, a dish selected by the user from dishes displayed on a display component on the dining table; and perform an ordering operation for the user according to the identified dish selected by the user; and the communication interface is configured to: receive the biometric feature information acquired and sent by the first acquisition unit on the dining table and the body movement information acquired and sent by the second acquisition unit on the dining table.

Some embodiments of the specification provide a dining table, including a first acquisition unit, a second acquisition unit, a communication interface, a processor, and a display component, where the processor is configured to: when a first acquisition instruction is triggered, acquire biometric feature information by using the first acquisition unit, and send the biometric feature information to a server device by using the communication interface; when a second acquisition instruction is triggered, acquire body movement information by using the second acquisition unit, and send the body movement information to the server device by using the communication interface, for the server device to identify a dish selected by a user corresponding to the biometric feature information from dishes displayed on the display component on the dining table; the first acquisition unit is configured to: acquire the biometric feature information, and send the biometric feature information to the processor; the second acquisition unit is configured to: acquire the body movement information, and send the body movement information to the processor; the communication interface is configured to send the biometric feature information to the server device, and send the body movement information to the server device; and the display component is configured to display the dishes.

The first acquisition unit and the second acquisition unit on the dining table may be a same acquisition unit, or may be different acquisition units.

Some embodiments of the specification provide a turnstile control device, including a communication interface and a processor, where the processor is configured to: receive, by using the communication interface, biometric feature information acquired and sent by a first acquisition unit on a turnstile and first body movement information acquired and sent by a second acquisition unit on the turnstile; identify, according to the biometric feature information sent by the first acquisition unit, a user corresponding to the biometric feature information; when detecting, according to the first body movement information sent by the second acquisition unit, that a first body movement of the user satisfies a specified condition, determine whether there is a ticket purchase record of the user; and if yes, send an opening instruction to the turnstile by using the communication interface; or if not, not send an opening instruction; and the communication interface is configured to: receive the biometric feature information acquired and sent by the first acquisition unit on the turnstile and the first body movement information acquired and sent by the second acquisition unit on the turnstile; and send the opening instruction to the turnstile.

Some embodiments of the specification provide a turnstile, including a first acquisition unit, a second acquisition unit, a communication interface, a processor, and a gate, where the processor is configured to: when a first acquisition instruction is triggered, acquire biometric feature information by using the first acquisition unit, and send the biometric feature information to a server device by using the communication interface; when a second acquisition instruction is triggered, acquire first body movement information by using the second acquisition unit, and send the first body movement information to the server device by using the communication interface, for the server to identify a user corresponding to the biometric feature information; when detecting that a first body movement of the user satisfies a specified condition, determine whether there is a ticket purchase record of the user; and if yes, return an opening instruction; or if not, not return an opening instruction; the processor is configured to: when receiving the opening instruction by using the communication interface, control the gate to be open; the first acquisition unit is configured to: acquire the biometric feature information, and send the biometric feature information to the processor; the second acquisition unit is configured to: acquire the body movement information, and send the body movement information to the processor; and the communication interface is configured to: send the biometric feature information to the server device, send the first body movement information to the server device, receive the opening instruction returned by the server, and send the opening instruction to the processor.

The first acquisition unit and the second acquisition unit on the turnstile may be a same acquisition unit, or may be different acquisition units.

Some embodiments of the specification provide an information processing method based on Internet of Things, including: receiving, by a server device, biometric feature information sent by a first device, where the first device is an Internet of Things device; identifying, according to the biometric feature information, a user corresponding to the biometric feature information; and performing an operation for the user.

Some embodiments of the specification provide an information processing device based on Internet of Things, including a communication interface and a processor, where the processor is configured to: receive, by using the communication interface, biometric feature information sent by a first device; identify, according to the biometric feature information, a user corresponding to the biometric feature information; and perform an operation for the user, where the first device is an Internet of Things device; and the communication interface is configured to: receive the biometric feature information sent by the first device, and send the biometric feature information to the processor.

According to the application, identity authentication of a user can be implemented according to acquired biometric feature information of the user and by using the first device and the server device that can exchange information by using Internet of Things. The first device is an Internet of Things device, so that the user does not need to carry a mobile terminal. Compared with the existing technologies, the foregoing methods provided in the application are more convenient and safer.

BRIEF DESCRIPTION OF THE DRAWINGS

The accompanying drawings described herein are used to provide a further understanding of the application, and constitute a part of the application. Embodiments of the application and descriptions thereof are used to explain the application, and do not constitute any inappropriate limitation on the application. In the accompanying drawings.

DETAILED DESCRIPTION OF THE INVENTION

To make the objectives, technical solutions, and advantages of the application clearer, the technical solutions of the application will be described below with reference to embodiments of the application and corresponding accompanying drawings. Obviously, the described embodiments are merely some but not all of the embodiments of the application. All other embodiments obtained by a person of ordinary skill in the art based on the embodiments of the application without creative efforts shall fall within the protection scope of the application.

In the application, based on increasingly mature Internet of Things, a user may also be used as a network element in the Internet of Things. In the Internet of Things, identity authentication and an operation can be performed based on a biometric feature or a body movement of the user. The operation may include a transaction operation or other operations. A transaction operation may include, for example, a payment operation. Other operations may include, for example, providing a service.

Embodiment 1

Figure 1:
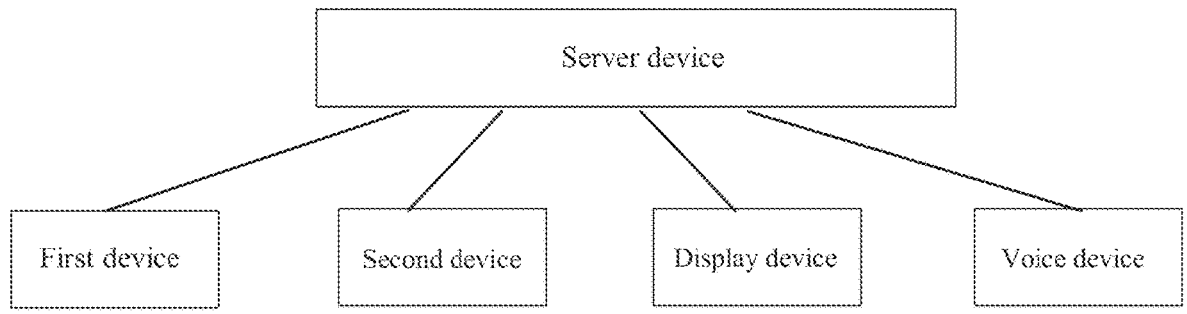
FIG. 1 shows an Internet of Things system according to an embodiment of the application.

A system on which the application is based is shown in FIG. 1. FIG. 1 is an Internet of Things system according to an embodiment of the application. The system includes a first device, a second device, and a server device. All of the first device, the second device, and the server device may be in an Internet of Things environment. That is, all of the first device, the second device, and the server device may exchange information through a network. In addition, the first device and the second device in the application may be devices other than conventional mobile terminal devices such as a mobile phone, a notebook computer, a wearable device, or a tablet computer, and may be Internet of Things devices having a computing capability, e.g., network elements in the Internet of Things such as an intelligent appliance, furniture, or a transportation means, having computing, data transmission, storage, and acquisition functions.

In the system shown in FIG. 1, the first device is configured to: when a first acquisition instruction is triggered, acquire biometric feature information of a user, and send the acquired biometric feature information to the server device. The biometric feature information includes one of or a combination of a plurality of physiological features and behavioral features. The physiological features include, but are not limited to, one of or a combination of some of a fingerprint, a palm print, a face, an iris, a pulse, and a blood pressure. The behavioral features include, but are not limited to, a gait. A person skilled in the art may understand that, any biometric feature information or any combination of a plurality of pieces of biometric feature information that can uniquely identify a user is within the protection scope of the application.

The second device is configured to: when a second acquisition instruction is triggered, acquire body movement information of a user, and send the acquired body movement information to the server device. A body movement includes, but is not limited to, a movement performed by the user through various body parts such as head, neck, hand, arm, body, hip, leg, foot, etc. The body movement described in the application may include operations performed on physical input devices or virtual input devices (such as a virtual keyboard formed by using a technology such as projection or holography), and further include movements performed on various physical or virtual objects (such as a physical product, a physical bicycle, or a virtual menu). In some embodiments, the movement may not be limited to an operation performed with respect to a physical or virtual device. For example, a user "grabs" a product with a hand in an offline retail shop, or a user "grips" a handlebar of a bicycle in an offline environment. The "grabbing" and "gripping" may not be operations with respect to an electronic device in a usual sense, but merely be body movements of the user. Acquiring such body movements also falls within the protection scope of the application.

The server device may be a server, or may be a server cluster including a plurality of servers, or may include a server (or a cluster) and one or more databases. The server device may be a cloud server device, or may be another server device. The server device is configured to: receive the biometric feature information acquired by the first device and the body movement information acquired by the second device, and perform an operation for the user according to the biometric feature information and the body movement information.

Although the application describes a first device and a second device, the quantity of devices is not limited. There may be a plurality of first devices and a plurality of second devices, or there may be one first device and one second device. The first device and the second device may alternatively be the same device. In addition, the foregoing system shown in FIG. 1 may further include other devices, such as a voice device and a display device, in the Internet of Things environment. These devices may also exchange information with the server device based on the network. Functions of these devices are described below in detail.

Figure 2:
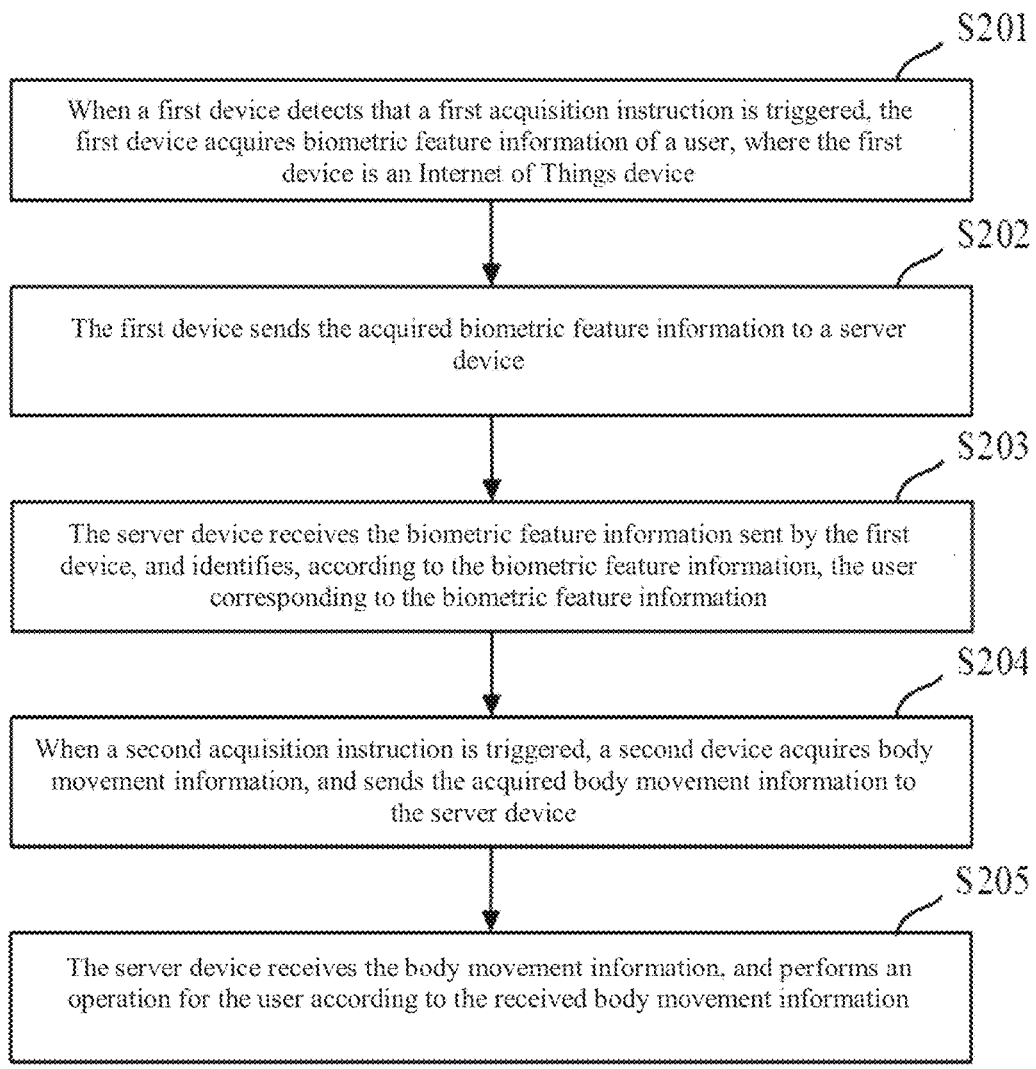
FIG. 2 shows an information processing process based on the system shown in FIG. 1 according to an embodiment of the application.

Based on the system shown in FIG. 1, an information processing method based on Internet of Things provided in the application is shown in FIG. 2. The information processing method may include the following steps S201-S203.

S201: When a first device monitors that a first acquisition instruction is triggered, the first device acquires biometric feature information of a user, where the first device is an Internet of Things device.

S202: The first device sends the acquired biometric feature information to the server device.

S203: The server device receives the biometric feature information sent by the first device, and identifies, according to the biometric feature information, the user corresponding to the biometric feature information.

In some embodiments, with respect to a method for triggering the first acquisition instruction of the first device by the user, a conventional triggering method generally may be that the user actively sends a request to a terminal device, and then the terminal device starts acquisition. However, in the application, the first device may not be a mobile terminal device, and the first device may be relatively fixed and may not be carried along by the user. Therefore, in addition to the conventional triggering method, a more active triggering manner may alternatively be used in this application. For example, the first device includes one or more sensors, and triggers the first acquisition instruction according to information detected by the one or more sensors. Examples are provided in the following manners.

1. Distance sensor or proximity sensor: The first device monitors, by using a distance sensor or proximity sensor, whether there is an object whose distance to the first device is less than a set distance; and if there is an object whose distance to the first device is less than the set distance, the first acquisition instruction of the first device is triggered. That is, a distance sensor or proximity sensor is installed on the first device, and when determining that an object approaches the first device to some extent of closeness, the first device performs biometric feature acquisition. Certainly, if the approaching object is not a human, biometric features may not be acquired, and a subsequent process may be skipped.

2. Optical sensor: The first device monitors, by using an optical sensor, whether an intensity of illumination received by the first device is lower than an illumination intensity threshold (where the illumination intensity threshold may be preset); and if yes, the first acquisition instruction of the first device is triggered. That is, an optical sensor is installed on the first device, and when an object blocks lights in front of the optical sensor and the lights turn from bright to dark, the first device performs biometric feature acquisition. Certainly, if the object that approaches is not a human, biometric features may not be acquired, and a subsequent process may be skipped.

3. Temperature sensor: The first device monitors, by using a temperature sensor, whether a temperature of an environment in which the first device is located is higher than a temperature threshold (where the temperature threshold may be preset); and if yes, the first acquisition instruction of the first device is triggered. That is, a temperature sensor is installed on the first device. Generally, when a human approaches the temperature sensor, a change of the temperature around the sensor may be caused by breath and the like. When the temperature change exceeds a threshold, the first device performs biometric feature acquisition. Certainly, if the temperature change is not caused by an approaching human, the biometric feature acquisition may not be performed, and a subsequent process may be skipped.

The foregoing are merely three examples, and do not limit the protection scope of the application. In all manners of triggering an acquisition instruction by using a sensor installed on the first device, whether a single sensor is used or a plurality of sensors is comprehensively used, the manners fall within the protection scope of the application. In addition, the conventional triggering manner may also be used in combination with the foregoing triggering manners by using sensors.

When the first device acquires the biometric feature information of the user, one or more biometric features of the user may be acquired by using various devices. For example, a face, an eye feature, or a gait is acquired by using a camera, a voice of the user is acquired by using a microphone, and a fingerprint of the user is acquired by using a fingerprint sensor.

The server device stores one or more biometric feature samples of the user. When receiving the biometric feature information, the server device may perform 1:N matching of the received biometric feature information and the biometric feature samples, and identify the user according to a matching result.

When the received biometric feature information is biometric feature information of one type, the server device may determine a similarity between the biometric feature information and each biometric feature sample of the same type, and determine a biometric feature sample having a highest similarity as a biometric feature sample that matches the received biometric feature information; or in the biometric feature samples whose similarities are greater than a set threshold, determine a biometric feature sample having a highest similarity as a biometric feature sample that matches the received biometric feature information.

When the received biometric feature information is biometric feature information of a plurality of types, the server device may determine, by using the foregoing method, a biometric feature sample that matches the biometric feature information for each type of biometric feature information, and then determine a user according to each determined biometric feature sample. For example, the server device may determine, according to the determined biometric feature sample that matches each type of biometric feature information, the user corresponding to each biometric feature sample; and if the users corresponding to the determined biometric feature samples are the same user, or in the determined users respectively corresponding to the biometric feature samples, more than a set quantity or a set ratio of the users are the same user, the server device may determine the same user as the user corresponding to the received biometric feature information; otherwise, the server device cannot determine the user according to the received biometric feature information, that is, the identification fails.

The method shown in FIG. 2 may further include the following step S204 and step S205.

S204: When a second acquisition instruction is triggered, the second device acquires body movement information of the user, and sends the acquired body movement information to the server device.

S205: The server device receives the body movement information, and performs an operation for the user according to the received body movement information.

In some embodiments, after user identification is performed or during user identification, when detecting that the second acquisition instruction is triggered, the second device acquires the body movement information of the user. A method for monitoring triggering of the second acquisition instruction by the second device may include that the first device receives an identification result that is obtained by identifying the biometric feature information and that is returned by the server device, determines whether the identification result is consistent with stored registered user information; and if yes, the first device sends a triggering message to the second device, to trigger the second acquisition instruction of the second device. Alternatively, after the server device determines that the user corresponding to the biometric feature information sent by the first device is an authorized user, the server device sends a triggering message to the second device, to trigger an acquisition instruction of the second device. Further, the method for monitoring triggering of the second acquisition instruction by the second device may alternatively be the same as the method for monitoring, by the first device, whether the first acquisition instruction is triggered. The second acquisition instruction may be actively triggered by the user, or may be actively triggered by the second device according to information detected by a sensor arranged on the second device, and details will not be repeated herein. After the user identification is completed, the second device may send the acquired body movement information to the server device, for the server device to perform the operation for the user according to the body movement information. Certainly, a body movement may alternatively be identified by the second device, and the second device performs an operation for the user according to a body movement identification result.

An example in which the server device identifies the body movement information and performs the operation for the user is described below.

For example, the server device may pre-store a correspondence between each body movement and an operation. Alternatively, for different second devices, the server device may set all pieces of body movement information corresponding to the second device, and then for each piece of body movement information corresponding to the second device, the server device sets a correspondence between the body movement information and an operation. That is, the server device sets a correspondence between the three, a second device, body movement information, and an operation. For example, assuming that the second device is a public bicycle that is in an Internet of Things environment and that may exchange information with the server device, the body movement information corresponding to the second device may be set to include sitting down, riding the bicycle with both legs, gripping a handlebar with a palm, and the like, and an operation corresponding to the body movement of gripping a handlebar with a palm may be set to be unlocking a lock of the bicycle. In another example, assuming that the second device is a dining table that is in an Internet of Things environment and that may exchange information with the server device, a body movement corresponding to the second device may be, for example, dragging a projected virtual object (projected by using holography or another technology), giving a thumb up, etc., and an operation corresponding to the body movement of dragging a projected virtual object may be set to be ordering a dish corresponding to the virtual object.

The server device may determine, through the correspondences between second devices, body movement information, and operations and according to the second device that sends the body movement information, all pieces of body movement information corresponding to the second device, then determine body movement information that matches the received body movement information in all the pieces of body movement information corresponding to the second device, and finally perform a corresponding operation for the user according to the determined body movement information that matches the received body movement information.

In addition, if there is one first device configured to acquire biometric feature information in the system shown in FIG. 1 (there may be one or more second devices), the server device may perform the operation for the user determined in step S203 according to the biometric feature information acquired by the first device and the body movement information acquired by the second device. However, if the system shown in FIG. 1 includes a plurality of first devices each is configured to acquire biometric feature information and a plurality of second devices each is configured to acquire body movement information, the first devices may acquire biometric feature information of different users, and the second devices acquires body movement information of different users, then the server device may learn of the body movement performed by the user corresponding to the biometric feature information, to correctly perform the operation for the user subsequently.

Therefore, in an embodiment of the application, when the first device and the second device are not the same device, a binding relationship between each first device and each second device may be set. The binding relationship may be set by a device manufacturer or an online/offline service provider who uses these devices. In the application, the binding relationship between the devices (including the binding relationship between devices described below) may be a correspondence between the devices. The correspondence may be preset, or may be set in the server device. When receiving biometric feature information acquired by a first device, the server device may determine, by using the foregoing step S203, a user corresponding to the biometric feature information, receive body movement information sent by a second device bound with the first device, and perform a corresponding operation for the determined user according to the body movement information.

If the first device and the second device are the same device, that is, the first device (is also the second device) can acquire biometric feature information of a user, and also body movement information of the user, the server device may determine a corresponding user according to the biometric feature information acquired by the first device, and perform a corresponding operation for the user according to the body movement information acquired by the first device.

In an embodiment of the application, the system shown in FIG. 1 may further include a voice device. The voice device is configured to acquire voice information of a user, and send the acquired voice information to the server device. The voice device may further be configured to receive and play information returned by the server device. The voice information of the user may include voiceprint feature information, and may further include semantics of the user. Therefore, the server device may use the received voice information as a type of biometric feature information for identifying the user, and may also return corresponding reply information to the voice device after performing semantic analysis on the voice information, for the voice device to play the reply information, or perform an operation for the user according to the semantics.

When the user is identified by using the voiceprint feature information included in the voice information acquired by the voice device, the voice device may be integrated into the first device. That is, the voice device and the first device may be the same device, and the biometric feature information acquired by the first device may further include the voiceprint feature information. A method for identifying, by the server device, the user by using the biometric feature information including the voiceprint feature information is similar to step S203 described above, and details will not be elaborated herein again. Certainly, the voice device may alternatively be used as an independent device. When the voice device is an independent device, the voice device may be bound with the first device.

When the operation is performed for the user by using the semantics included in the voice information acquired by the voice device, the voice device may be integrated into the second device. That is, the voice device and the second device are the same device. Certainly, the voice device may alternatively be used as an independent device, and may be bound with the first device, for the server to learn of a second device that acquires voice information of the user corresponding to the biometric feature information acquired by the first device. In such a situation, the second device may send the acquired body movement information and/or voice information to the server device. On one hand, the server device may determine, according to the body movement information, the operation to be performed for the user; on the other hand, the server device may perform semantic recognition on the received voice information, and determine, according to the identified semantics and a set correspondence between semantics and each operation, an operation to be performed for the user. If the operation determined according to the body movement information is the same as the operation determined according to the semantics, the operation is performed for the user. Otherwise, query information may be returned to the second device, to ask the user for an operation that the user truly wants to perform, and prompt the user to perform a correct body movement and give correct voice, or both the operation determined according to the body movement information and the operation determined according to the semantics may be performed, and when both the operations are performed, an order of performing the two different operations may be determined according to a service policy preset in the server device.

In an embodiment of the application, the system shown in FIG. 1 may further include a display device. The display device is bound with at least one of the foregoing first devices, the second devices, and the voice devices, and is configured to receive and display response information returned by the server device according to at least one of the foregoing biometric feature information, the body movement information, and the voice information. For example, after determining the user according to the biometric feature information acquired by the first device, the server device may return stored user information of the user as the response information to the display device bound with the first device for displaying. After determining, according to the body movement information acquired by the second device, the operation to be performed, the server device may return operation detail information corresponding to the operation as the response information to the display device bound with the second device for displaying. After determining, according to the voice information acquired by the voice device, reply information to be returned, the server device may return the reply information as the response information to the display device bound with the voice device for displaying.

In some embodiments, the server device may return the response information to the display device, or may send the response information to the foregoing first devices, the second devices, or the voice devices, and then the first devices, the second devices, or the voice devices may forward the response information to the display devices for displaying. The foregoing display devices may include, but are not limited to, a display, a projector, or a holographic projection device.

In an embodiment of the application, the system shown in FIG. 1 may further include a vital sign detection device. The vital sign detection device is bound with at least one of the foregoing first devices, the second devices, and the voice devices, and is configured to: detect vital sign information of a user, and send the detected vital sign information to the server device. After determining the user according to the biometric feature information acquired by the first device, the server device receives the vital sign information detected by the vital sign detection device bound with the first device; determines, according to the received vital sign information and a stored recommendation rule, information or an operation to be recommended to the user; and then sends the information or the operation to be recommended to the user to the voice device bound with the vital sign detection device for playing to the user, or sends the information or the operation to be recommended to the user to the display device bound with the vital sign detection device for displaying to the user. The vital sign information may refer to information that can reflect a physical condition of the user, including, but not limited to, a heartbeat rate, a blood pressure, etc.

Certainly, after determining the corresponding user according to the biometric feature information acquired by the first device, the server device may alternatively extract behavioral data of the user that is stored in the server device or obtain behavioral data of the user from other systems, and perform big data analysis according to the behavioral data of the user, to determine the information or the operation to be recommended to the user.

In addition, the system shown in FIG. 1 may alternatively not include the second device, after receiving the biometric feature information sent by the first device, and identifying, according to the biometric feature information, the user corresponding to the biometric feature information, the server device may directly perform an operation for the user. The operation may include, but is not limited to, a payment operation.

When the server device identifies that the user is an authorized user, the server device may perform an operation for the user. Alternatively, when identifying that the user is an authorized user, the server device may send an operation execution instruction to the first device, and the first device performs an operation for the user according to the operation execution instruction. For example, the server device may pre-store a biometric feature sample of an authorized user. When receiving the biometric feature information sent by the first device, the server device matches the biometric feature information with the prestored biometric feature sample, and if the matching succeeds, the server device determines that the user is an authorized user; otherwise, the server device determines that the user is not an authorized user.

Further, the server device may pre-store an operation corresponding to the first device, so that when performing an operation for the user, the server device may perform the operation corresponding to the first device for the user. Certainly, if an operation is performed by the first device, when determining that the identified user is an authorized user, the server device may send an operation execution instruction corresponding to the operation to the first device, for the first device to perform the corresponding operation. If the first device has stored an operation to be performed, the server device may alternatively send an confirmation message to the first device as an operation execution instruction after determining that the identified user is an authorized user, for the first device to perform, for the user, the operation already stored in the first device.

According to the foregoing methods, the operation can be performed for the user with or without using a mobile terminal device carried by the user. Compared with a current widely applied method for performing an operation by using a mobile terminal such as a mobile phone, according to the foregoing methods provided in the application, convenience can be effectively improved, and loss caused by a lost or stolen mobile terminal can also be avoided.

Applications of the foregoing methods are described below by using examples in different scenarios.

First Scenario: Using a Public Bicycle

In an embodiment of the application, a first acquisition unit configured to acquire biometric feature information and a second acquisition unit configured to acquire body movement information may be arranged on a bicycle. The bicycle may be not only the first device but also the second device. Both the first acquisition unit and the second acquisition unit may be arranged in the middle or at either or both of the ends of the bicycle's handlebar.

Figure 3A:
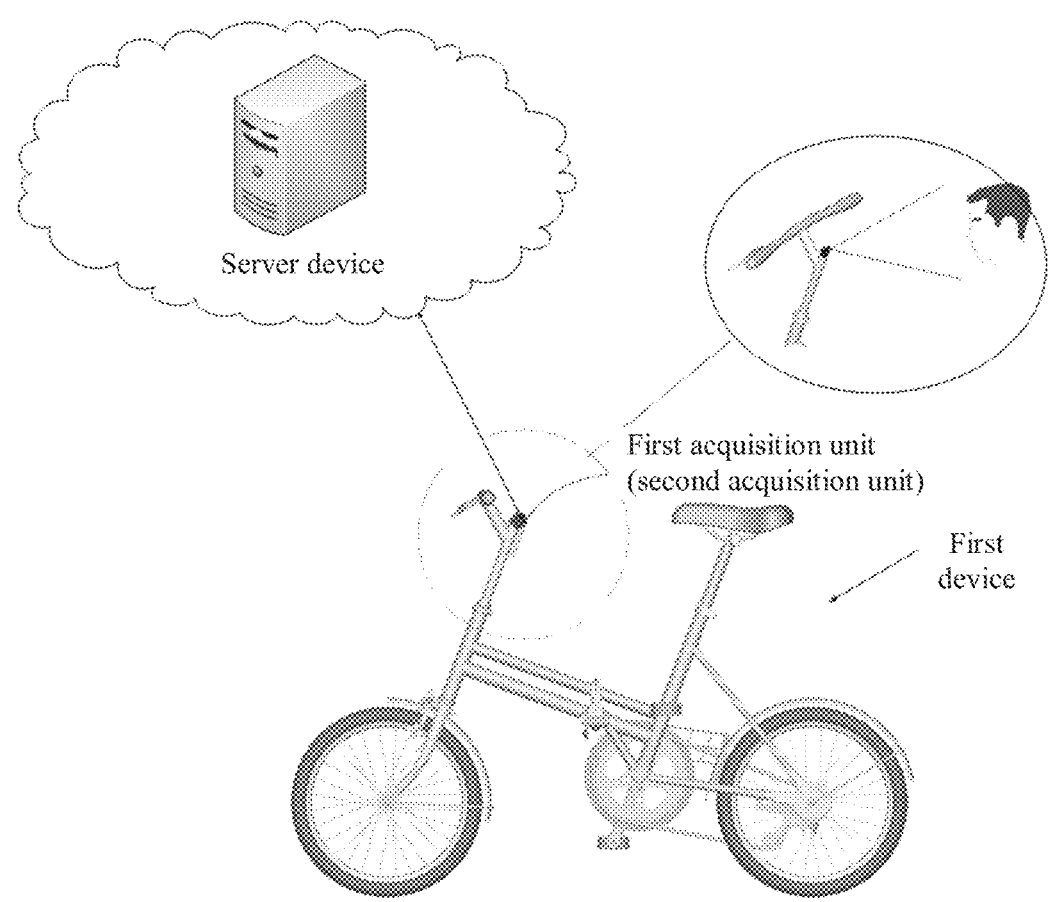
FIG. 3a is a schematic diagram of a first bicycle unlocking method according to an embodiment of the application.

In an embodiment, as shown in FIG. 3a, the first acquisition unit may be a camera arranged in the middle of the handlebar, and is configured to acquire face information. The camera may further acquire a body movement of a user, such as sitting down or gripping the handlebar with one or both hands. Thus, the camera may also be used as the second acquisition unit. That is, the first acquisition unit and the second acquisition unit are the same acquisition unit.

Figure 3B:
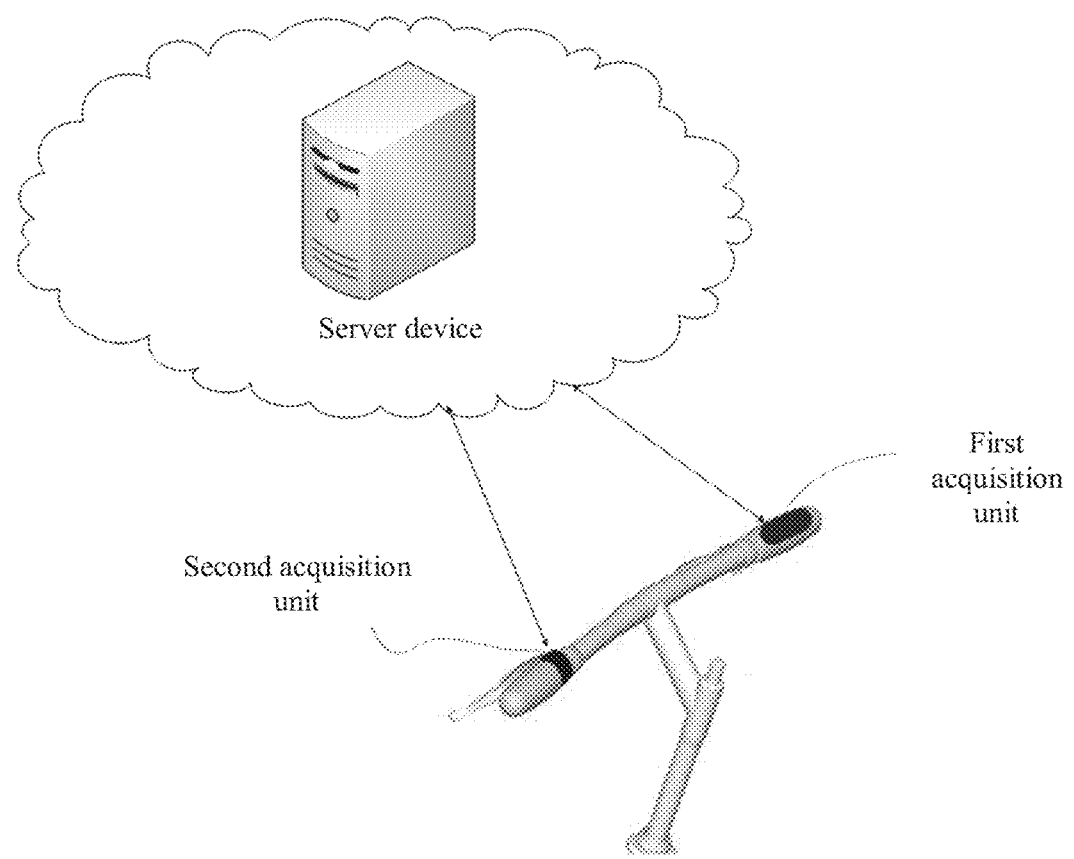
FIG. 3b is a schematic diagram of a second bicycle unlocking method according to an embodiment of the application.

In another embodiment, as shown in FIG. 3b, the first acquisition unit may alternatively be an acquisition unit that acquires a fingerprint and/or a palm print. The acquisition unit is arranged at one end of the handlebar, and is configured to acquire the fingerprint or the palm print. The second acquisition unit may be a pressure sensor arranged at the other end of the handlebar, and is configured to acquire pressure applied on the end of the handlebar, that is, a grip strength of the user for gripping the handlebar. When the grip strength is greater than a pressure threshold (where the pressure threshold may be preset), it may be determined that a body movement of the user is gripping the handlebar with one or both hands.

The bicycle shown in FIG. 3a and FIG. 3b further includes at least one processor (not shown in FIG. 3a and FIG. 3b). The processor may be installed at any part of the bicycle, and may be connected to the first acquisition unit and the second acquisition unit. The processor is configured to: monitor whether a first acquisition instruction of the first acquisition unit is triggered, and whether a second acquisition instruction of the second acquisition unit is triggered; when the first acquisition instruction of the first acquisition unit is triggered, control the first acquisition unit to acquire the biometric feature information, receive the biometric feature information acquired by the first acquisition unit, and send the biometric feature information to a server device; and when the second acquisition instruction of the second acquisition unit is triggered, control the second acquisition unit to acquire the body movement information, receive the body movement information acquired by the second acquisition unit, and send the body movement information to the server device. The processor is further configured to receive an operation instruction returned by the server device, to perform operations to control other components of the bicycle, for example, controlling to unlock a lock of the bicycle.

Taking FIG. 3b as an example, when a user uses the public bicycle, the user may grip the handlebar of the public bicycle with one or both hands, to trigger the first acquisition instruction of the first acquisition unit on the handlebar. The first acquisition unit acquires a fingerprint and/or a palm print of the user, and sends the acquired fingerprint and/or palm print to the server device by using the processor. The server device determines, by using step S203 shown in FIG. 2, the user corresponding to the received fingerprint and/or palm print.

When the user grips the handlebar of the public bicycle with one or both hands, the second acquisition instruction of the pressure sensor (the second acquisition unit) on the handlebar may also be triggered. The pressure sensor may acquire a grip strength of the user. When the grip strength is greater than the pressure threshold, it is determined that the body movement information of the user is gripping the handlebar with hands, and thus the body movement information is sent to the server device by using the processor. After determining the corresponding user by using the fingerprint and/or the palm print acquired by the acquisition unit, the server device determines that the body movement information of gripping the handlebar with one or both hands is received from the pressure sensor bound with the acquisition unit, and performs, by using step S205 shown in FIG. 2, a corresponding operation according to the body movement information.

In some embodiments, an operation rule corresponding to the bicycle may be set in the server device. When performing the corresponding operation according to the body movement information, the server device may determine an account of the user first, and deduct a corresponding amount of money from the account of the user according to the set operation rule corresponding to the bicycle. If the deduction succeeds, the server device sends an unlocking instruction to the processor of the bicycle, and the processor of the bicycle unlocks the lock of the bicycle, for the user to use the bicycle. If the deduction fails, the server device may not send the unlocking instruction.

The bicycle shown in FIG. 3a or FIG. 3b may further include a vital sign detection component, a display component, and a voice component that are connected to the processor. The vital sign detection component may also be arranged on one or both ends of the handlebar, and is configured to detect vital sign information including a heartbeat, a pulse, and a blood pressure. The display component may be implemented by using a holographic projection device, and may be arranged at any portion of the handlebar. For example, the display component may be arranged according to the needs of the user for conveniently viewing holographic projection during riding. The voice component may be arranged at any portion of the bicycle.

The vital sign detection component may detect vital sign information of the user in real time during a process in which the user uses the bicycle, and report the vital sign information to the server device by using the processor. The server device monitors a physical condition of the user in real time according to the vital sign information of the user and a stored monitoring policy. If detecting that the physical condition of the user is abnormal, the server device may generate corresponding prompt information as response information, and send the response information to the display component for displaying or send the response information to the voice component for playing. The server device may further determine, according to the physical condition of the user, information (for example, a product, medicine, a merchant, or a route to the merchant) to be recommended to the user, and send the information to the display component or the voice component.

For example, the public bicycle further includes a positioning component that can report location information to the server device in real time. When detecting, according to the vital sign information reported by the vital sign detection component, that the user lacks water, the server device may determine, according to a stored recommendation rule, to recommend water product (such as mineral spring bottle water) to the user. The server device may further determine a route from the current geographical location to an offline merchant, according to an electronic map stored in the server device, information about the offline merchant (for example, products sold by the merchant, an address of the merchant, etc.), and a current geographical location reported by the positioning component on the bicycle, and send information indicating that the user lacks water, the recommended water product, and the route from current geographical location to the offline merchant to the display component for displaying.

A person skilled in the art should understand that, types of the first acquisition units, the second acquisition units, the vital sign detection components, the display components, the voice components, and the positioning components, and their locations on the bicycle may be determined according to actual needs.

Second Scenario: Offline Shopping

In an embodiment of the application, a first acquisition unit configured to acquire biometric feature information and a second acquisition unit configured to acquire body movement information are respectively arranged on a shelf of an offline shop, and an acquisition unit configured to acquire biometric feature information of a user may further be arranged on a device such as a turnstile or a gate at an exit of the offline shop. A device arranged at the exit is referred to as an exit device below.

Figure 4A:
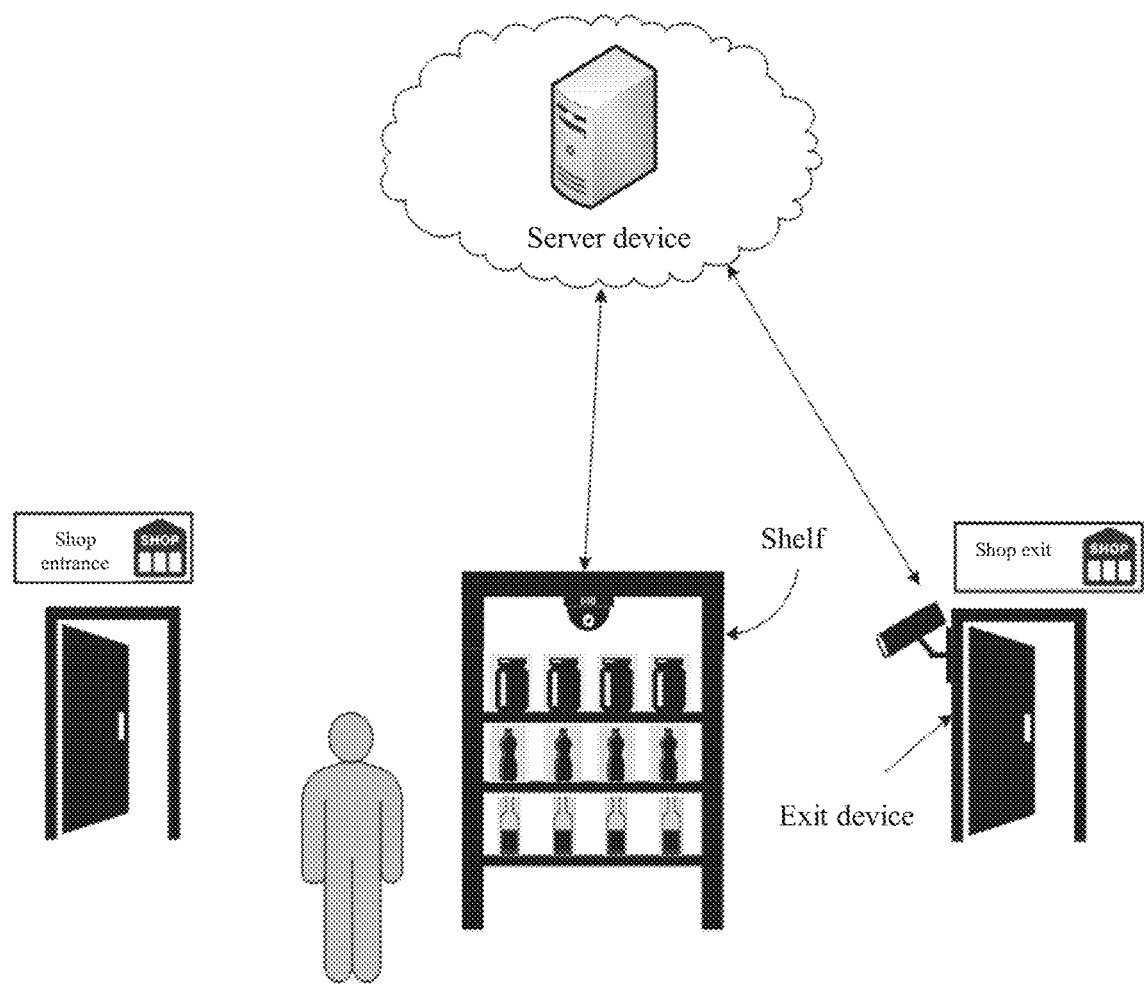
FIG. 4a is a schematic diagram of a first offline shopping method according to an embodiment of the application.

In an embodiment, as shown in FIG. 4a, the acquisition unit arranged on the exit device may include a camera, and the first acquisition unit arranged on the shelf may also include a camera. The first acquisition unit may be arranged on an outer surface of the body of the shelf. For example, the first acquisition unit may be arranged on a support arm of the shelf. The second acquisition unit arranged on a shelf may also include a camera. For example, the second acquisition unit and the first acquisition unit are the same acquisition unit. All the shelves are bound with the exit device.

The shelf shown in FIG. 4a further includes at least one processor (not shown in FIG. 4a). The processor may be installed at any part of the shelf, and is connected to the first acquisition unit and the second acquisition unit. The processor is configured to: monitor whether a first acquisition instruction of the first acquisition unit is triggered, and whether a second acquisition instruction of the second acquisition unit is triggered; when the first acquisition instruction of the first acquisition unit is triggered, control the first acquisition unit to acquire the biometric feature information, receive the biometric feature information acquired by the first acquisition unit, and send the biometric feature information to a server device; and when the second acquisition instruction of the second acquisition unit is triggered, control the second acquisition unit to acquire the body movement information, receive the body movement information acquired by the second acquisition unit, and send the body movement information to the server device.

The exit device shown in FIG. 4a further includes at least one processor (not shown in FIG. 4a). The processor may be installed at any part of the exit device, and is connected to the acquisition unit of the exit device. The processor is configured to: monitor whether a first acquisition instruction and/or a second acquisition instruction of the acquisition unit of the exit device is triggered; when the first acquisition instruction is triggered, control the acquisition unit to acquire the biometric feature information, receive the biometric feature information acquired by the acquisition unit, and send the biometric feature information to the server device; and when the second acquisition instruction is triggered, control the acquisition unit to acquire body movement information, receive the body movement information acquired by the acquisition unit, and send the body movement information to the server device. The processor is further configured to receive an operation instruction returned by the server device, for controlling other components of the exit device to perform other operations, for example, controlling the exit device to be on.

When a user purchases a product in the offline shop, the user may enter the offline shop and fetch a product. In this situation, the shelf is used as the first device, acquires at least one of a face, an iris, and a gait of the user as acquired biometric feature information by using the first acquisition unit, and sends the acquired biometric feature information to the server device by using the processor. The server device determines, by using step S203 shown in FIG. 2, the user corresponding to the biometric feature information. In addition, the shelf (which is also the second device) monitors a body movement of the user by using the second acquisition unit; determines, according to the detected body movement and a stored determining rule by using the processor, an object corresponding to the body movement of the user, and then sends the detected body movement information of the user and object information of the determined object to the server device. For the user determined by using step S203, the server device identifies, according to the received body movement information, the object information, and a stored operation rule, a product obtained by the user from the shelf; and records corresponding operation information for the user. A step of monitoring the body movement information by the shelf through the second acquisition unit may be triggered by the server device. For example, when the server device determines, according to the biometric feature information acquired by the first acquisition unit, that the user is an authorized user, the second acquisition instruction of the second acquisition unit is triggered.

When the user has picked the to-be-purchased products, the user leaves the offline shop through the exit. The exit device acquires at least one of the face, the iris, and the gait of the user as acquired biometric feature information, and sends the acquired biometric feature information to the server device by using the processor of the exit device. The server device also determines, by using step S203 shown in FIG. 2, that the user corresponding to the biometric feature information is the user who leaves the shop. However, when the server device determines that the received biometric feature information is sent by the exit device, on one hand, the server device determines an account corresponding to the user who leaves the shop; on the other hand, the server device queries operation information recorded for the user who leaves the shop, and performs, according to the queried operation information and the account corresponding to the user, a corresponding payment operation for the user who leaves the shop. When the operation information recorded for the user is being queried, all of the shelves bound with the exit device may be determined, and the operation information recorded for the user who leaves the shop is determined according to body movement information and object information sent by the shelves. In addition, after completing the payment operation for the user, the server device may send an exit opening instruction to the exit device. After receiving the exit opening instruction, the processor of the exit device may control the exit to be open, so as to allow the user to leave.

In the foregoing process, a determining rule based on which the shelf determines the object corresponding to the body movement of the user may be set by a merchant. For example, the shelf may obtain a body movement identification template. The template is used to enable a monitoring device to identify a location of the user in the offline shop, a type of a body movement of the user (the type of the body movement of the user may include taking and putting back), and an object orientation corresponding to the body movement of the user. After obtaining the foregoing template, the merchant may set, according to the template, a product identifier of a product corresponding to each object orientation, and input the set template into the processor of the shelf. The processor of the shelf may determine, according to the template in which the product identifier corresponding to each object orientation is set and the body movement of the user that is detected by the second acquisition unit, a type of the body movement (that is, the body movement information) of the user and a product identifier (that is, the object corresponding to the body movement of the user) corresponding to the body movement, and then send the type of the body movement of the user and the product identifier corresponding to the body movement to the server device.

An operation rule based on which the server device records corresponding operation information for the user according to the received body movement information and the object information may also be preset by the merchant. For example, the merchant may preset a correspondence between an account of the merchant and each shelf device, as well as a price corresponding to the foregoing each product identifier, as the operation rule, and send the operation rule to the server device. When receiving the biometric feature information acquired by the exit device, the server device may determine the user corresponding to the biometric feature information, determine a first sum of prices of product identifiers corresponding to taking-type body movements recorded for the user and a second sum of prices of product identifiers corresponding to putting down-type body movements, determine a difference between the first sum and the second sum, and transfer an amount of money corresponding to the difference from the account of the user into the account of the merchant.

Figure 4B:
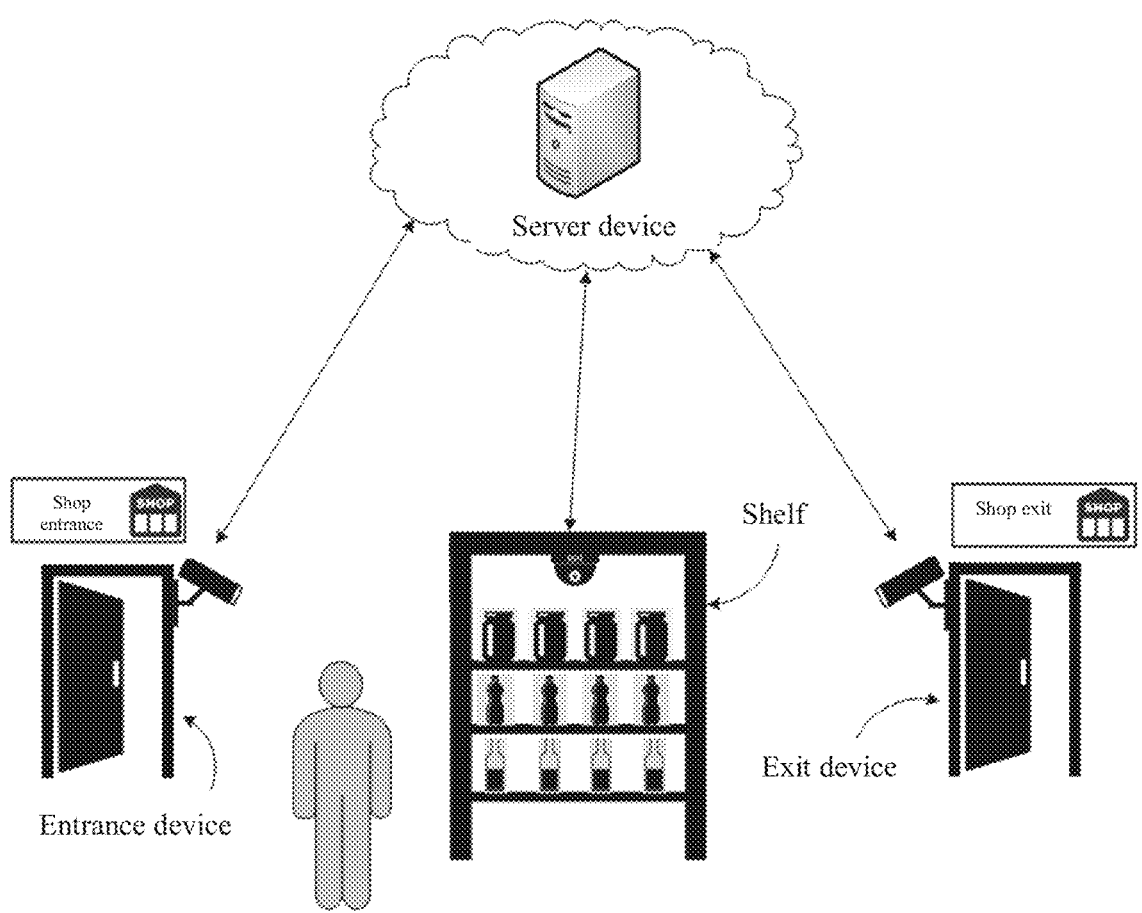
FIG. 4b is a schematic diagram of a second offline shopping method according to an embodiment of the application.

In another embodiment, in the offline shop shown in FIG. 4a, a first device configured to acquire biometric feature information may further be arranged at an entrance of the offline shop, as shown in FIG. 4b. The first device arranged at the entrance is referred to as an entrance device below. The entrance device is bound with the foregoing shelf device and the exit device. An acquisition unit configured to acquire biometric feature information and a processor configured to exchange information with the server are also arranged on the entrance device.

In FIG. 4b, when a user enters the offline shop to purchase a product, the entrance device may acquire at least one of a face, an iris, and a gait of the user as acquired biometric feature information, and send the acquired biometric feature information to the server device. The server device determines, by using step S203 shown in FIG. 2, the user corresponding to the biometric feature information. After determining the corresponding user according to the biometric feature information sent by the entrance device, on one hand, the server device may learn of, according to a prestored correspondence between the entrance device and a merchant, a merchant which the user enters; on the other hand, each biometric feature sample and a user identifier that correspond to the user and that are stored in the server device may be sent to each shelf bound with the entrance device. After the shelf, as the first device, acquires the biometric feature information of the user, the shelf may identify, by using the processor and according to the received user identifier and the biometric feature sample corresponding to the user, the user corresponding to the acquired biometric feature information instead of sending the information to the server device for identification of the user. After identifying the user, the shelf may monitor a body movement of the user, determine an object corresponding to the body movement of the user, and send the identified user's identifier, the detected body movement, and the object corresponding to the body movement to the server device, for the server device to learn which user takes or puts back which product. When the user leaves the offline shop after picking the to-be-purchased product, after the exit device sends the acquired biometric feature information of the user to the server device, the server device may perform a payment operation for the user. Similarly, a step of acquiring the body movement information by the shelf may be triggered after the server device authenticates that the user is an authorized user.

Certainly, after identifying the corresponding user according to the biometric feature information acquired by the entrance device, the server device may alternatively mark the user instead of sending the biometric feature sample of the user and the user identifier to the shelf. When receiving the biometric feature information sent by the shelf device, the server device may identify, according to a biometric feature sample corresponding to the identified user, a user corresponding to the biometric feature information. When receiving the biometric feature information sent by the exit device, the server device may alternatively identify, according to the biometric feature sample corresponding to the marked user, a user corresponding to the biometric feature information sent by the exit device. After performing a payment operation for the identified user, the server device may delete the mark of the user. In this way, identification efficiency for identifying the user corresponding to the biometric feature information sent by the shelf and the user corresponding to the biometric feature information sent by the exit device can be effectively improved.

Further, if there is a relatively large quantity of shelf devices installed in scenarios shown in FIG. 4a or FIG. 4b, and monitoring ranges of the shelf devices overlap, to avoid a problem of repeatedly settling payment for the same user, when receiving biometric feature information (or an identifier of the user), body movement information, and an object corresponding to a body movement of a user that are sent by a shelf, the server device may further determine whether the same biometric feature information (or the identifier of the user), the same body movement information, and the same object corresponding to the body movement of the user that are sent by another shelf are received within a set time range. If yes, operation information is recorded for the user once according to the foregoing information sent by one of the foregoing shelves. That is, for different shelves sending same information within a short time, the server device maintains information sent by one of the shelves. If not, corresponding operation information may be respectively recorded for the user based on information sent by different shelves. The foregoing set time range may be set according to needs, for example, the time range is set to 5 seconds or 10 seconds.

A person skilled in the art should understand that, methods for implementing the first acquisition unit configured to acquire the biometric feature information and the second acquisition unit configured to acquire the body movement information may alternatively be implemented by using other methods, and details will not be elaborated herein.

Third Scenario: Dining in a Restaurant

In an embodiment of the application, a first acquisition unit configured to acquire biometric feature information, a second acquisition unit configured to acquire body movement information, and a display component may be arranged on a dining table in a restaurant, and a first device configured to acquire biometric feature information may further be arranged at an entrance and/or an exit of the restaurant.

Figure 5A:
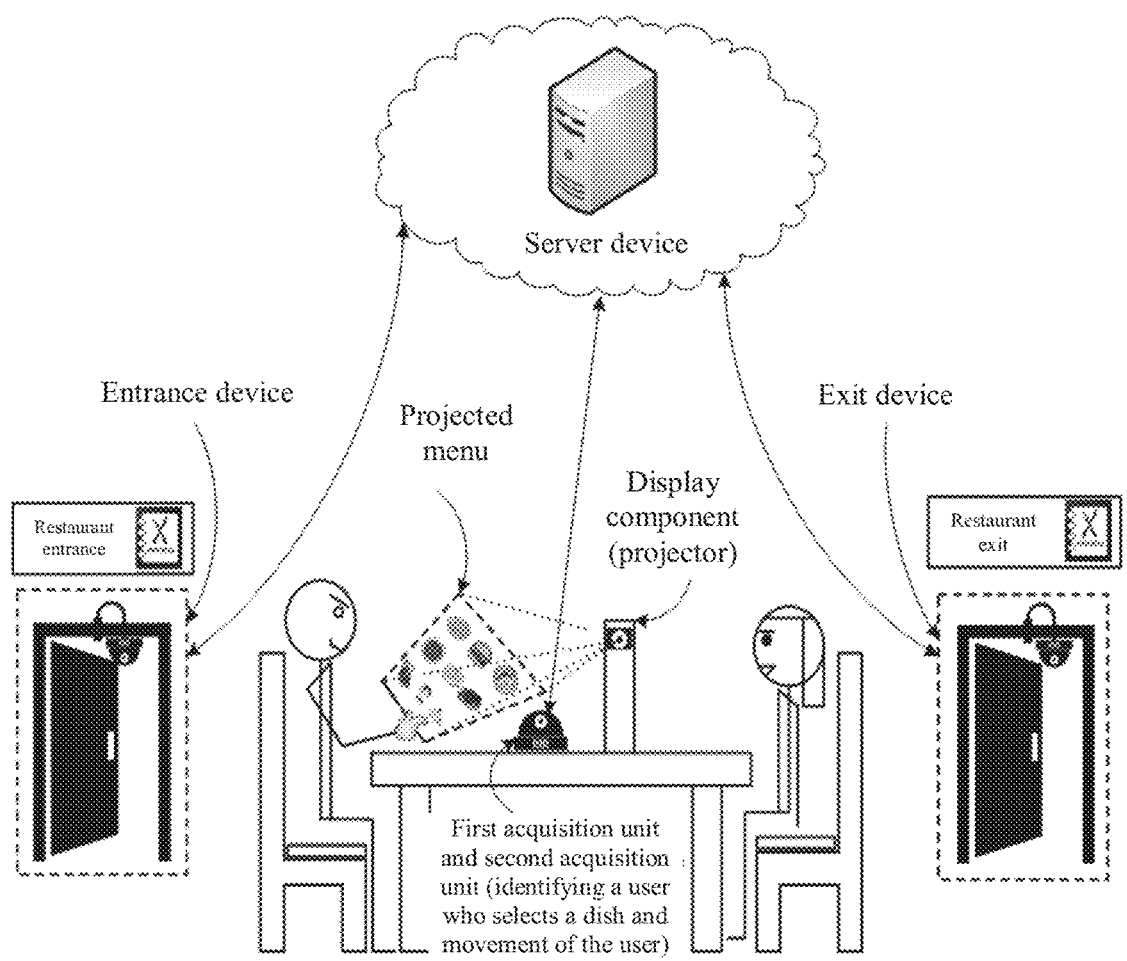
FIG. 5a is a schematic diagram of a first ordering method for dining in a restaurant according to an embodiment of the application.

In an embodiment, as shown in FIG. 5a, a first acquisition unit configured to acquire biometric feature information and a second acquisition unit configured to acquire body movement information that are arranged on a dining table in a restaurant may be the same acquisition unit, and may include a camera. A display component may include a projector or a holographic projection device. A first device arranged at the entrance of the restaurant is referred to as an entrance device below, and a first device arranged at the exit of the restaurant is referred to as an exit device below. The dining table in the restaurant, the entrance device, and the exit device are bound with one another.

The dining table further includes at least one processor (not shown in FIG. 5a). The processor may be installed at any part of the dining table, and is connected to the first acquisition unit and the second acquisition unit. The processor is configured to: monitor whether a first acquisition instruction of the first acquisition unit is triggered, and whether a second acquisition instruction of the second acquisition unit is triggered; when the first acquisition instruction of the first acquisition unit is triggered, control the first acquisition unit to acquire the biometric feature information, receive the biometric feature information acquired by the first acquisition unit, and send the biometric feature information to a server device; and when the second acquisition instruction of the second acquisition unit is triggered, control the second acquisition unit to acquire the body movement information, receive the body movement information acquired by the second acquisition unit, and send the body movement information to the server device.

Each of the entrance device and the exit device shown in FIG. 5a further includes at least one processor (not shown in FIG. 5a), and the processor may be installed at any part of each of the entrance device and the exit device. Functions of the processors are the same as the processors of the entrance device and the exit device of the shop in the second scenario, and details will not be repeated herein.

When a user enters the restaurant for dining, the entrance device acquires at least one of a face, an iris, and a gait of the user as acquired biometric feature information, and sends the acquired biometric feature information to the server device. The server device determines, by using step S203 shown in FIG. 2, the user corresponding to the biometric feature information, and marks the user.

When the user sits down at the dining table and orders food after entering the restaurant, the dining table is used as the first device, so that at least one of the face and the iris of the user is acquired as acquired biometric feature information by using the first acquisition unit, and the acquired biometric feature information is sent to the server device by using the processor. The server device may determine, according to a stored biometric feature sample of the marked user and the biometric feature information sent by the dining table, the user detected by the dining table. On the other hand, the display component including the projector or the holographic projection device may display a menu of the restaurant for the user, for the user to order foods. Thus, the dining table is used as a second device, and body movement information of the user may further be acquired by using the second acquisition unit.

Similar to the offline shopping described in the second scenario, when acquiring the body movement information of the user by using the second acquisition unit, the processor of the dining table may identify a type of a body movement of the user (where the type of the body movement of the user may include taking and putting back) according to a stored body movement identification template and an object corresponding to the body movement (where the object is a dish in a menu displayed by the display device). The template may further include a type of a body movement indicating that the user finishes food ordering. For example, a type of a movement of giving a thumb up may be set as finishing food ordering. The processor of the dining table sends the detected biometric feature information of the user, each piece of body movement information of the user, and an object corresponding to the piece of body movement information to the server device. The server device may identify, according to the foregoing information sent by the dining table, a dish selected by the user from dishes displayed on the display component of the dining table; and record the dish selected by the user. When determining that the body movement information sent by the dining table is finishing food ordering, the server device may send the body movement information to a merchant device bound with the dining table, to order the selected dish for the user. The merchant device may be a terminal of a restaurant manager or a restaurant back kitchen, a display device, or the like. A step of acquiring the body movement information by the dining table may alternatively be triggered after the server device authenticates that the user corresponding to the biometric feature information is an authorized user.

After the meal, the user may leave the restaurant through the exit of the restaurant. The exit device acquires the biometric feature information of the user and sends the biometric feature information of the user to the server device. When receiving the biometric feature information acquired by the exit device, the server device determines, according to the biometric feature sample of the marked user and the biometric feature information sent by the exit device, the user who leaves the restaurant; determines, according to information sent by each dining table bound with the exit device, the dish recorded for the user; then performs a corresponding payment operation for the user according to a prestored operation rule, the determined dish, and an account corresponding to the user; and deletes the mark of the user. The operation rule may be preset in the server device by a restaurant operator, and the operation rule may include a price corresponding to each dish.

Figure 5B:
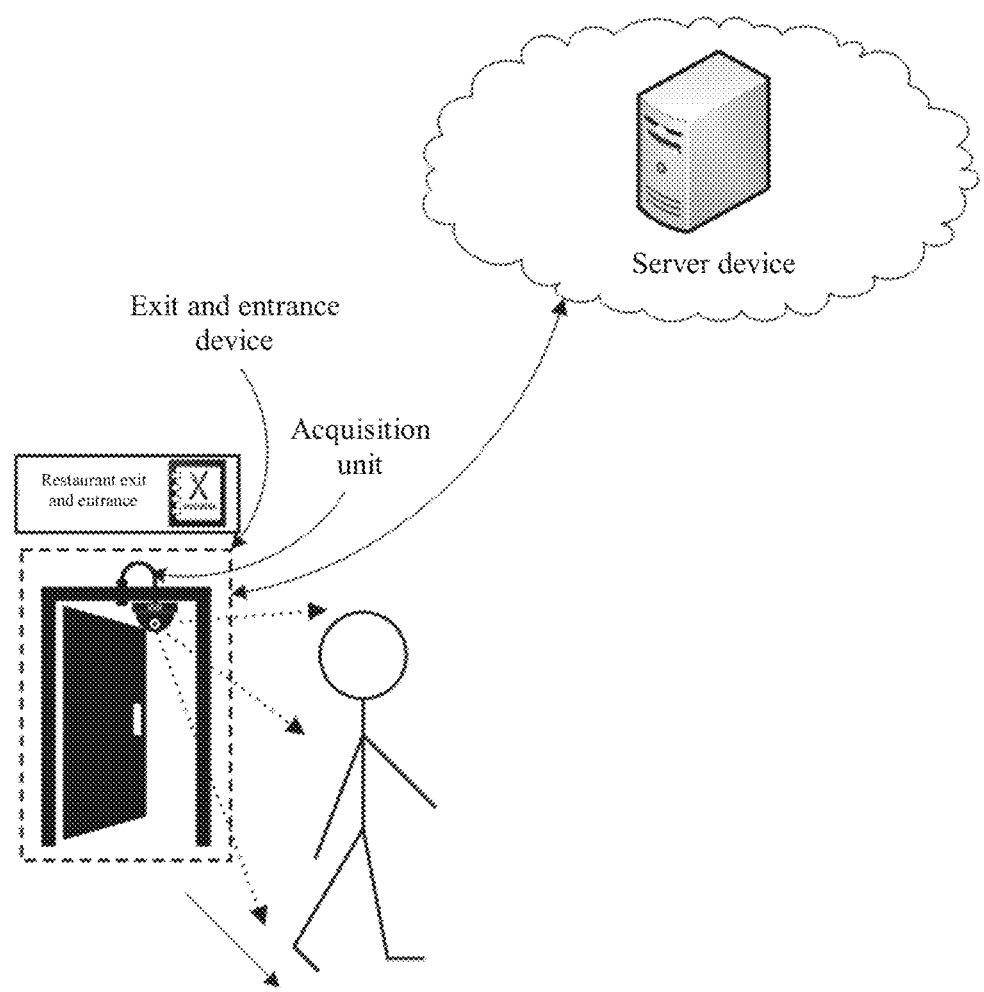
FIG. 5b is a schematic diagram of a second ordering method for dinning in a restaurant according to an embodiment of the application.

In another embodiment, given that an exit and an entrance may be the same for many restaurants, a first device and a second device are arranged at an exit/entrance of a restaurant, as shown in FIG. 5b. The first device and the second device may be the same device, and are referred to as an exit and entrance device below. The exit and entrance device includes an acquisition unit (such as a camera) configured to acquire biometric feature information and body movement information of a user.

The exit and entrance device further includes at least one processor (not shown in FIG. 5b). The processor may be installed at any part of the exit and entrance device, and is connected to the acquisition unit of the exit and entrance device. The processor is configured to: monitor whether a first acquisition instruction and/or a second acquisition instruction of the acquisition unit is triggered; when the first acquisition instruction is triggered, control the acquisition unit to acquire the biometric feature information, receive the biometric feature information acquired by the acquisition unit, and send the biometric feature information to a server device; and when the second acquisition instruction is triggered, control the acquisition unit to acquire the body movement information, receive the body movement information acquired by the acquisition unit, and send the body movement information to the server device.

In FIG. 5b, on one hand, the exit and entrance device acquires biometric feature information of a user; on the other hand, the exit and entrance device further acquires body movement information of the user. The body movement information includes a moving direction of the user. The exit and entrance device sends the acquired biometric feature information and the acquired body movement information of the user (e.g., the moving direction of the user) to the server device. The server device may determine, according to the user corresponding to the biometric feature information, and may further determine, according to the body movement information of the user (e.g., the moving direction of the user), whether the user currently enters the restaurant or leaves the restaurant. A determining method may alternatively be preset in the server device by a restaurant operator. When determining that the user enters the restaurant, the server device may select and order food for the user by using a method that same as that in FIG. 5a. When determining that the user leaves the restaurant, the server device may perform payment for the user by using a method the same as that in FIG. 5a. Details will not be elaborated herein.

In addition, in FIG. 5a or FIG. 5b, a vital sign detection device may further be arranged on the dining table and is configured to detect vital sign information of the user, and send the vital sign information to the server device. The server device may recommend a dish for the user according to the vital sign information, and send the recommended dish to the display component of the dining table for displaying.

A person skilled in the art should understand that, methods for implementing the first acquisition unit configured to acquire the biometric feature information and the second acquisition unit configured to acquire the body movement information may alternatively be implemented by using other methods, and details will not be elaborated herein.

The application scenarios of the information processing methods provided in the application are merely described above as examples. The information processing methods may further be applied to other application scenarios, for example, places where tickets are required for entry, such as a cinema, a theater, etc. An entrance turnstile of the place may include a first acquisition unit configured to acquire biometric feature information, a second acquisition unit configured to acquire body movement information, and a processor configured to exchange information with a server device. After selling a ticket to a user, a ticketing system of the place may send an identifier of the user to the server device, and the server device stores a ticket purchase record for the user. When the user enters an entrance, the turnstile acquires biometric feature information of the user by using the first acquisition unit, acquires first body movement information of the user by using the second acquisition unit, and sends the biometric feature information and the first body movement information to the server device by using the processor. After determining the corresponding user according to the biometric feature information, and detecting that the first body movement information satisfies a specified condition (for example, the first body movement information indicates that the user is going to enter the turnstile), the server device determines whether there is a ticket purchase record of the user; and if yes, the server device sends an opening instruction to the processor of the turnstile, and the processor of the turnstile controls the turnstile to be open; or if not, the server device does not send an opening instruction. After the turnstile is open, the second acquisition unit may acquire second body movement information of the user and send the second body movement information to the server. After determining, according to the second body movement information, that the user has passed through the turnstile, the server deletes the ticket purchase record of the user, and sends a closing instruction to the processor of the turnstile, for the processor of the turnstile to control the turnstile to be closed.

According to the foregoing methods provided in the application, operations such as entering a password and scanning a quick response code or a barcode may be performed without requiring a user to carry a mobile terminal, so as to complete operations such as payment and food ordering, thereby improving convenience of the user's life, and also avoiding loss caused by a lost or stolen mobile terminal.

Embodiment 2

In Embodiment 2, information processing is also performed based on Internet of Things and used for performing an operation for a user. For security, in addition to the first device, the second device, and the server device described in Embodiment 1, an Internet of Things system in Embodiment 2 may further include a human body chip of the user.

Figure 6:
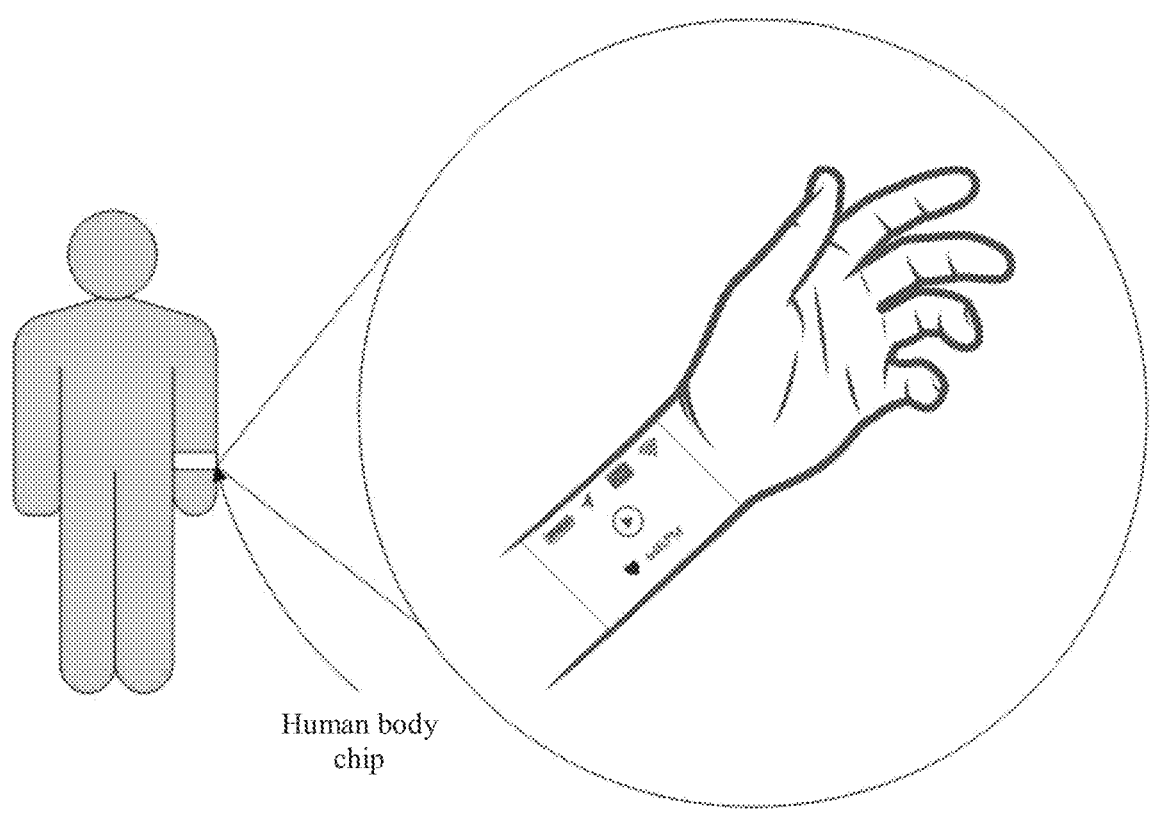
FIG. 6 is a schematic diagram of a human body chip according to an embodiment of the application.

As shown in FIG. 6, the human body chip may be attached to skin of a human body or may be implanted in the human body. The human body chip has a function of exchanging information with other devices, and may store authentication information uniquely corresponding to the user (for example, a digital certificate uniquely corresponding to the user), and may further acquire biometric feature information, such as a pulse, of the user. The human body chip may communicate with other devices by using near field communication (NFC) technology, or may communicate with other devices through radio frequency signals, wireless networks, and in other manners.

Figure 7:
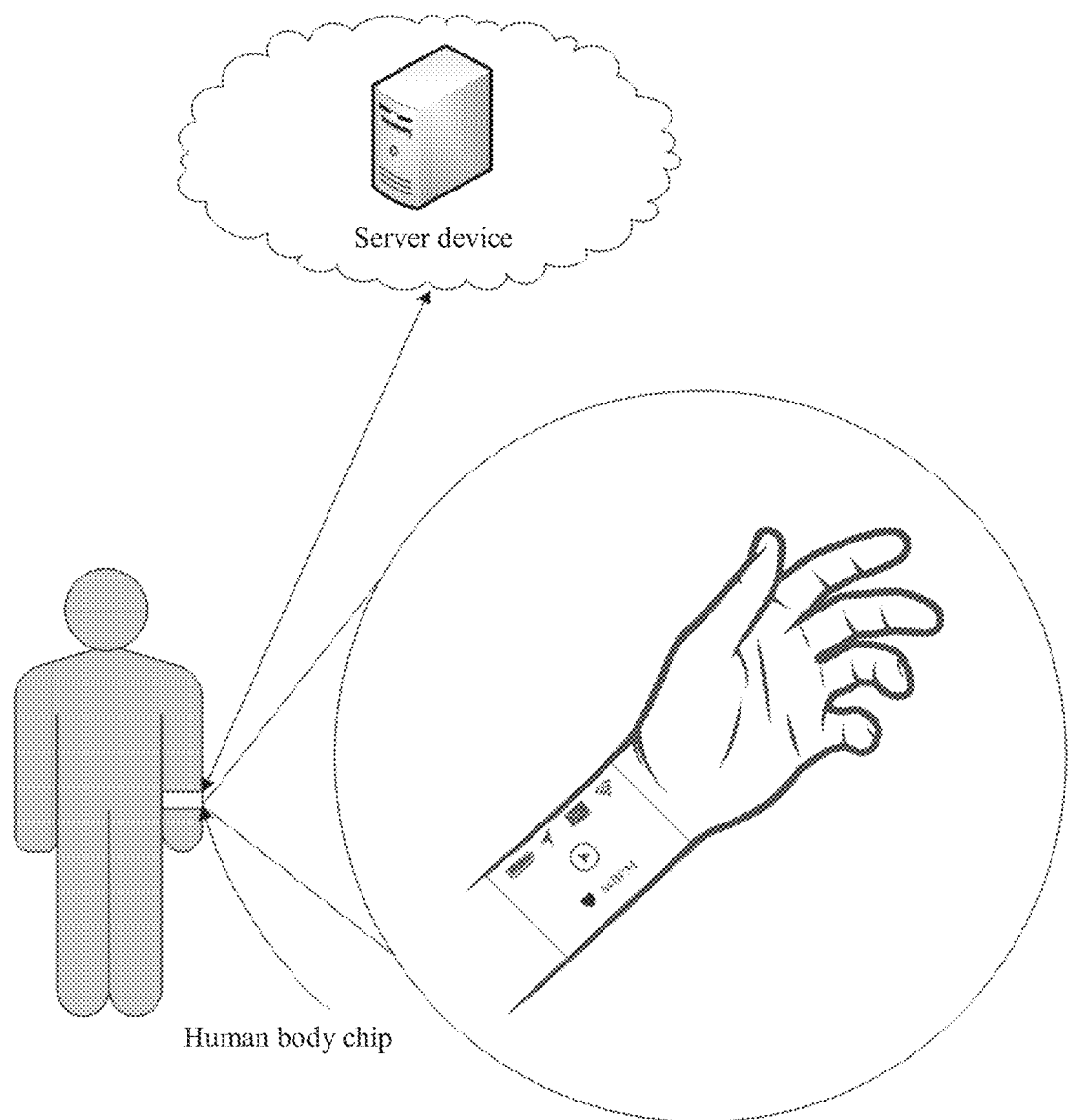
FIG. 7 is a schematic diagram of an Internet of Things system based on FIG. 6 according to an embodiment of the application.

Based on the human body chip shown in FIG. 6, the Internet of Things system provided in Embodiment 2 is shown in FIG. 7 and includes a human body chip, a first device, a second device, and a server device. All of the human body chip, the first device, the second device, and the server device are in an Internet of Things environment, that is, all of the human body chip, the first device, the second device, and the server device may exchange information by using a network. The first device and the second device may have a binding relationship.

In the system shown in FIG. 7, the human body chip is configured to: send a digital certificate that uniquely identifies the user to the first device; and/or acquire biometric feature information of the user, and send the biometric feature information of the user to the first device. To ensure security, the biometric feature information acquired by the human body chip may be a pulse. The biometric feature information acquired by the human body chip is referred to as first biometric feature information below.

The first device (not shown in FIG. 7) is configured to receive the digital certificate or the biometric feature information sent by the human body chip. When receiving the digital certificate or the biometric feature information sent by the human body chip, the first device may trigger a first acquisition instruction, acquire biometric feature information of the user, and send, to the server device, the digital certificate or the biometric feature information sent by the human body chip and the biometric feature information acquired by the first device. To ensure security, the biometric feature information acquired by the first device may be a gait. The biometric feature information acquired by the first device is referred to as second biometric feature information below.

The second device (not shown in FIG. 7) is configured to: acquire body movement information of the user when a second acquisition instruction is triggered, and send the acquired body movement information to the server device. That is, the second device has the same function as that in Embodiment 1.

After receiving the second biometric feature information, the digital certificate, and/or the first biometric feature information that are sent by the first device, the server device may determine users respectively corresponding to the second biometric feature information, the digital certificate, and the first biometric feature information. If the determined users are the same user, the server device may perform an operation for the user according to the body movement information acquired by the second device. If the determined users are not the same user, the server device may not perform the operation. For example, when determining that the users respectively corresponding to the second biometric feature information, the digital certificate, and the first biometric feature information are the same user, the server device may determine that the user is an authorized user, and trigger the second acquisition instruction of the second device.

In this way, it can be ensured that the human body chip can take effect correctly when being used by the user having the human body chip. If a lawbreaker uses a human body chip of another user, the server device does not perform an operation because the user corresponding to a digital certificate of the human body chip or acquired first biometric feature information is inconsistent with the user corresponding to the second biometric feature information acquired by the first device.

Similar to Embodiment 1, the first device and the second device in Embodiment 2 may be the same or different devices. In addition, the foregoing system shown in FIG. 7 may further include other devices, such as a voice device, a display device, etc., in the Internet of Things environment. These devices may also exchange information with the server device based on the network.

In the system shown in FIG. 7, the server device prestores a correspondence between a user and one of or a combination of a plurality of biometric feature samples of the user, and further stores a correspondence between a user and a digital certificate of the user. Both a method for determining a corresponding user according to first biometric feature information and second biometric feature information by the server device and a method for performing an operation for the user according to the body movement information are the same as those in Embodiment 1, and details will not be repeated herein.

The methods provided in Embodiment 2 of the application may also be applied to the first scenario to the third scenario in Embodiment 1.

For example, in the first scenario, when receiving a digital certificate and/or first biometric feature information sent by a human body chip, a processor of a bicycle determines that a first acquisition instruction is triggered, starts to acquire second biometric feature information of a user by using a first acquisition unit, sends the second biometric feature information, the digital certificate, and/or the first biometric feature information to the server device; acquires body movement information of the user by using the second acquisition unit, and sends the body movement information to the server device. When authenticating that users respectively corresponding to the second biometric feature information, the digital certificate, and/or the first biometric feature information are the same user, the server device triggers a second acquisition instruction of the second acquisition unit, for the bicycle to acquire the body movement information of the user by using the second acquisition unit, and send the body movement information to the server device. The server device deducts, according to the body movement information, a corresponding amount of money from an account corresponding to the user, and sends an unlocking instruction to the processor of the bicycle. The processor of the bicycle unlocks the lock of the bicycle according to the unlocking instruction. If determining that users respectively corresponding to the second biometric feature information, the digital certificate, and/or the first biometric feature information are not the same user, the server device does not send an unlocking instruction, and may further send to the user according to stored contact information of the user corresponding to the digital certificate and/or the first biometric feature information, a notification indicating that the human body chip is stolen, or freeze an account of the user.

For another example, in the second scenario, when receiving a digital certificate and/or first biometric feature information sent by a human body chip, an entrance device (which may alternatively be a shelf or an exit device, and the entrance device is merely used as an example herein for description) determines that a first acquisition instruction is triggered, starts to acquire second biometric feature information of a user, and sends the second biometric feature information, the digital certificate, and/or the first biometric feature information to the server device. When authenticating that users respectively corresponding to the second biometric feature information, the digital certificate, and/or the first biometric feature information are the same user, the server device triggers a second acquisition instruction of the shelf, for the shelf to acquire body movement information, and continue to perform a subsequent operation in Embodiment 1. If determining that users respectively corresponding to the second biometric feature information, the digital certificate, and/or the first biometric feature information are not the same user, the server device may instruct the entrance device and/or the shelf bound with the entrance device, the exit device, or other devices to give an alarm, for an operator in the offline shop to learn that a person in the shop is shopping by using an identity of another user, and may further send a user image of the user corresponding to the second biometric feature information acquired by the entrance device to the display device bound with the entrance device or display devices of other systems (for example, a display device of a public security system) for displaying, for the operator in the offline shop to easily find the lawbreaker who is shopping by using the identity of the another person.

The methods provided in Embodiment 2 of the application may further be applied to other scenarios. Applications of the methods in Embodiment 2 are described below by taking different scenarios as examples.

Fourth Scenario: Smart Household

In the application, a furniture device may include a first acquisition unit configured to acquire biometric feature information and a second acquisition unit configured to acquire body movement information. The first acquisition unit and the second acquisition unit may be the same device, or may be different acquisition units. An example in which the first acquisition unit and the second acquisition unit are the same acquisition unit is described below.

Figure 8:
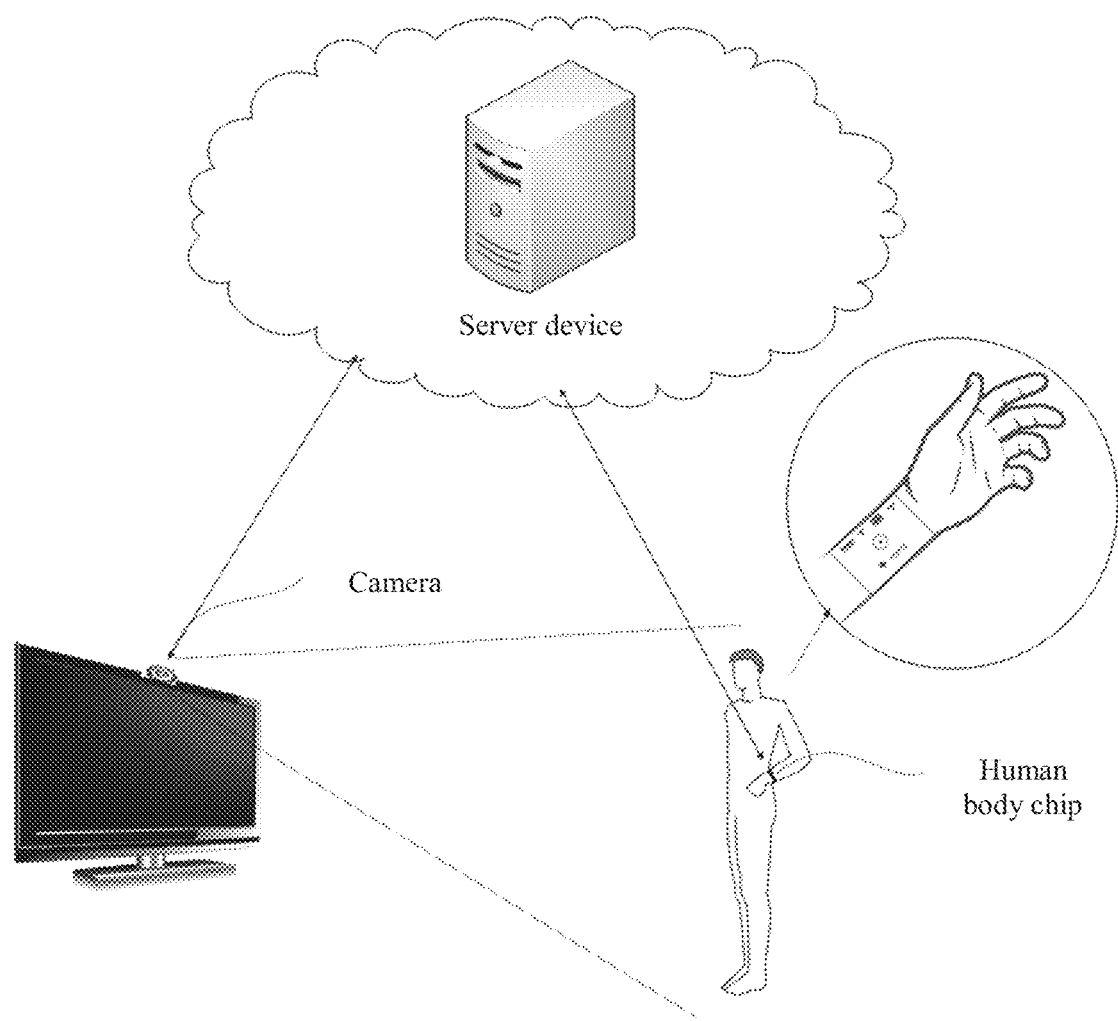
FIG. 8 is a schematic diagram of an information recommendation method according to an embodiment of the application.

In FIG. 8, a television includes a camera serving as both the first acquisition unit and the second acquisition unit. The camera is configured to acquire biometric feature information and body movement information of a user. The television further includes at least one processor (not shown in FIG. 8) configured to exchange information with a server.

When receiving a digital certificate and/or first biometric feature information sent by a human body chip, the processor of the television determines that a first acquisition instruction is triggered. The processor may acquire second biometric feature information of the user by using the acquisition unit, and send the second biometric feature information, the digital certificate, and/or the first biometric feature information to the server device. When authenticating that users respectively corresponding to the second biometric feature information, the digital certificate, and/or the first biometric feature information are the same user, the server device may determine an identifier of the television, and determine, according to prestored information about a user who has permission to use the furniture device (e.g., the television) corresponding to the identifier, whether the user has permission to use the furniture device. If yes, the server device triggers a second acquisition instruction of the television for the television to acquire body movement information by using the acquisition unit and send the acquired body movement information to the server device, and the server device sends an operation instruction to the furniture device according to the received body movement information; if the server device determines that users respectively corresponding to the second biometric feature information, the digital certificate, and/or the first biometric feature information are not the same user, or the user does not have permission to use the furniture device, the server device does not send an operation instruction to the furniture device.

In addition, since the human body chip is attached to skin of a human body or is implanted in the skin of the human body, the human body chip may further be configured to: acquire vital sign information of the user, and send the acquired vital sign information to the server device. That is, the human body chip may be used as a vital sign detection device. When authenticating that the user has permission to use the foregoing furniture device (the television), the server device may detect, according to the received vital sign information, a physical condition of the user, determine, according to the physical condition, information and/or an operation to be recommended to the user (for example, a recommended product), and then sends the information and/or the operation to the television for displaying. The television may continue to acquire body movement information of the user by using the camera and send the acquired body movement information to the server device. The server device may determine, according to the body movement information, a product selected by the user, and perform an ordering operation for the product.

In the foregoing process, for ease of displaying, a system shown in FIG. 8 may further include a display device. The display device is not the television shown in FIG. 8, but is a thin film display. The thin film display may display information through projection or holographic projection. The thin film display may be worn on a wrist of the user, and is bound with the human body chip. The thin film display receives and displays information sent by the human body chip bound with the thin film display. After determining a product to be recommended to the user, the server device may directly send the product to the human body chip. The human body chip sends the product to the thin film display for displaying. The television acquires body movement information of the user by using the camera and sends the acquired body movement information to the server device for the server device to learn of the product selected by the user.

In addition, since both the foregoing human body chip and the thin film display are attached to the user or worn on the user, a communication link between the human body chip and the thin film display may be a human body, that is, the human body chip transmits information to be displayed to the thin film display through human body conduction.

The foregoing merely describes an example in which the human body chip is used as the vital sign detection device. In other embodiments, the vital sign detection device may not be the human body chip, and details will not be elaborated herein.

Fifth Scenario: Face-to-Face Payment

A first device and a second device may be arranged on a vendor booth, the first device and the second device may include a camera, and the second device is bound with a human body chip of the vendor. An example in which the first device and the second device are the same device is taken as an example below for description.

Figure 9:
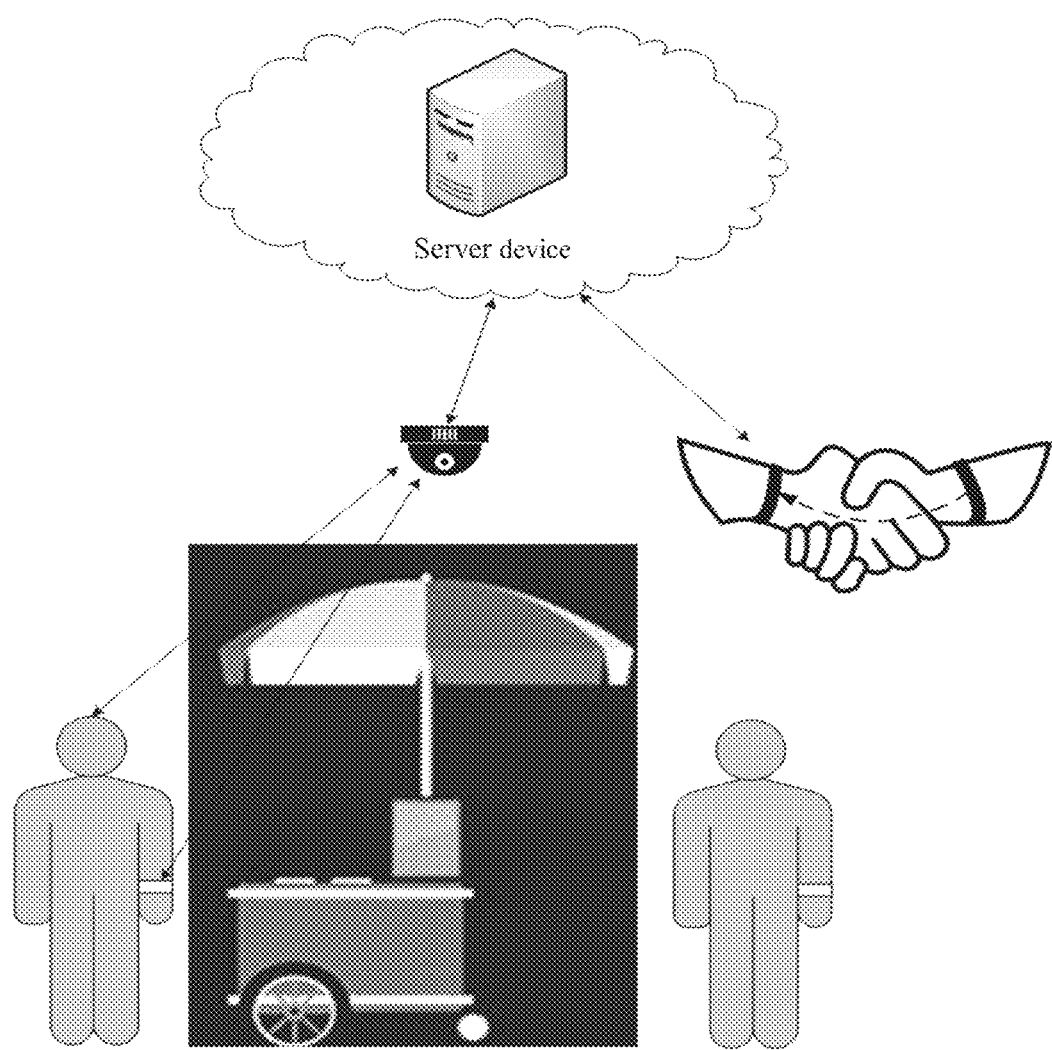
FIG. 9 is a schematic diagram of a face-to-face payment method according to an embodiment of the application.

As shown in FIG. 9, the camera receives a digital certificate and/or first biometric feature information sent by the human body chip, determines that a first acquisition instruction is triggered, acquires second biometric feature information of the vendor, and sends the second biometric feature information, the digital certificate, and/or the first biometric feature information to a server device. After authenticating that users corresponding to the second biometric feature information, the digital certificate, and/or the first biometric feature information are the same user (where the user is the vendor), the server device triggers a second acquisition instruction of the camera, receives body movement information acquired by the camera, and determines, according to a stored identification rule (where the identification rule is not elaborated herein) and the body movement information, whether the vendor has sold the product. If yes, the server device may send a payment preparation instruction to the human body chip of the vendor. The human body chip may transmit information by using a human body as a transmission medium by means of human body conduction. Therefore, the vendor may obtain, through touching a body of a buyer (for example, through a handshake) and by using the human body chip of the vendor, a digital certificate and/or first biometric feature information included in a human body chip of the buyer (a dashed line in FIG. 9 indicates transmitting the digital certificate and/or the first biometric feature information included in the human body chip through the human body), and then sends the obtained digital certificate and/or the first biometric feature information of the buyer to the server device. The server device determines, a buyer user according to the received digital certificate and/or the first biometric feature information of the buyer, and transfers a specified amount of money into an account of the vendor from an account of the buyer user according to the stored operation rule (where the operation rule may be set in the server device by the vendor). The digital certificate and/or the first biometric feature information that is transmitted by using the human body as the transmission medium may have a mark, to be distinguished from a digital certificate and/or first biometric feature information that is transmitted by using a transmission medium other than the human body. After obtaining the digital certificate and/or the first biometric feature information that has the mark, the human body chip of the vendor sends the obtained digital certificate and/or the first biometric feature information to the server device; otherwise, the human body chip of the vendor does not send the certificate and/or information to the server device.

In addition, when receiving the payment preparation instruction sent by the server device, the human body chip of the vendor obtains the digital certificate and/or the first biometric feature information of the buyer. After the digital certificate and/or the first biometric feature information of the buyer is received, the payment preparation instruction becomes invalid.

Certainly, in the embodiments of the application, a system including the server device and the human body chip also has use value, and can be applied to other scenarios.

For example, since the human body chip may acquire vital sign information, the human body chip may send the acquired vital sign information to the server device; the server device detects a physical condition of the user according to the vital sign information, and returns a detection result to the human body chip; and then the human body chip sends the detection result to the thin film display for displaying. Therefore, in a scenario of detecting a vital sign of a user, neither the first device nor the second device may be required.

For another example, the human body chip may store a digital certificate uniquely corresponding to a user, and may further acquire biometric feature information such as a pulse. Therefore, the human body chip may send the digital certificate and the acquired biometric feature information to the server device at a preset interval. When authenticating that users respectively corresponding to the digital certificate and the acquired biometric feature information are the same user, the server device may perform no operation. If the server device determines that users respectively corresponding to the digital certificate and the acquired biometric feature information are not the same user, which indicates that the human body chip may be used by another person, then the server device may send alarm information to the users respectively corresponding to the digital certificate and the acquired biometric feature information.

Embodiment 3

In Embodiment 3 of the application, information processing is still performed based on Internet of Things. A difference from Embodiment 1 and Embodiment 2 lies in that in Embodiment 3, the system in FIG. 1 may not include a server device.

In some scenarios in which biometric feature samples of a plurality of users are not required to be stored, requirements on data storage and processing performance are not high. Therefore, the server device may not store these biometric feature samples, and the server device may not identify the user. The biometric feature sample may be stored in the first device, and the user is identified by the first device. Similarly, an operation to be performed may further be stored in an Internet of Things device such as the first device or the second device, and the operation is performed by the Internet of Things device that stores the operation.

In Embodiment 3, when a first acquisition instruction is triggered (where a method for triggering the first acquisition instruction is the same as the method for triggering the first acquisition instruction in Embodiment 1, and details will not be elaborated herein), the first device acquires biometric feature information, and identifies, according to a stored biometric feature sample and the acquired biometric feature information, a user corresponding to the biometric feature information (where a method for identifying the user is the same as the method for identifying the user by the server device in Embodiment 1, and details will not be elaborated herein). Subsequently, the first device may perform an operation for the user. Alternatively, the first device may trigger a second acquisition instruction of the second device, the second device acquires body movement information of the user, and the second device performs an operation for the user according to the body movement information.

For example, when the first device is a home television having an Internet of Things function, biometric feature information of each family member may be stored in the television as a biometric feature sample. When a first acquisition instruction of the television is triggered, the television acquires biometric feature information of a user, and matches the acquired biometric feature information with each stored biometric feature sample. If the matching succeeds, a turn-on operation may be performed. After the television is turned on, the television plays a favorite program for the user according to stored favorites of the user corresponding to the biometric feature sample that matches with the biometric feature information. Alternatively, a second acquisition instruction of a set top box (where the set top box is the second device) having an Internet of Things function may be triggered, for the set top box to acquire body movement information of a user. The set top box may perform an operation, such as selecting a program or adjusting a volume, for the user according to the identified body movement information.

Except that the first device and the second device in Embodiment 3 of the application may replace the server device in Embodiment 1 and Embodiment 2 to identify biometric feature information and body movement information and perform an operation, other functions of the first device and the second device in Embodiment 3 are the same as the functions of the first device and the second device in Embodiment 1 and Embodiment 2, and details will not be elaborated herein. In addition, in Embodiment 3, a voice device, a display device, a vital sign detection device, a human body chip, and the like that are the same as those in Embodiment 1 and Embodiment 2 may further be included, and functions thereof are the same as those in Embodiment 1 and Embodiment 2, and details will not be elaborated herein.

The foregoing describes the information processing methods based on Internet of Things provided in the embodiments of the application. Based on the same thought, the application further provides corresponding devices.

Figure 10:
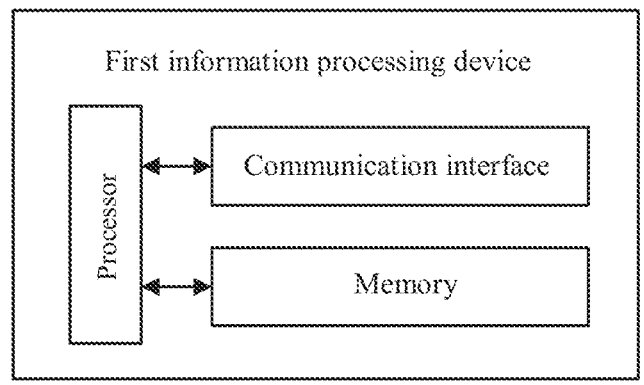
FIG. 10 shows a first information processing device according to an embodiment of the application.

FIG. 10 shows a first information processing device according to an embodiment of the application. The device includes a communication interface and a processor, where the communication interface is configured to receive biometric feature information sent by a first device; and the processor is configured to identify, according to the biometric feature information, a user corresponding to the biometric feature information, where the first device is an Internet of Things device.

In some embodiments, the device further includes a memory. The memory is configured to store all users and biometric feature samples corresponding to the users; and the processor is configured to: for all types of received biometric feature information, determine a similarity between the biometric feature information and each biometric feature sample prestored in the memory; determine, according to the determined similarity, a biometric feature sample that matches the biometric feature information; determine, according to a correspondence between each prestored biometric feature sample and a user, a user corresponding to the biometric feature sample that matches the biometric feature information; and when in users respectively determined for all the types of biometric feature information, more than a set quantity or a set ratio of the users are the same user, determine that the same user is an identification result.

In some embodiments, the communication interface is further configured to receive body movement information sent by a second device; and the processor is configured to perform an operation for the user according to the body movement information, where the second device is an Internet of Things device. The device further includes a memory; the memory is configured to store a correspondence between the second device and body movement information and a correspondence between each piece of body movement information set for the second device and an operation; and the processor is configured to: determine, according to the correspondence between the second device and the body movement information that is prestored in the memory, all pieces of body movement information corresponding to the second device; determine body movement information that matches the received body movement information in all the determined pieces of body movement information; and perform, according to the correspondence between each piece of body movement information set for the second device and an operation that is prestored in the memory, an operation corresponding to the body movement information that matches the received body movement information.

In some embodiments, the processor is further configured to: determine, according to the identified user, whether the user is an authorized user; and if yes, trigger a second acquisition instruction of the second device bound with the first device, for the second device to acquire the body movement information; or if not, not trigger a second acquisition instruction of the second device bound with the first device.

In some embodiments, the communication interface is further configured to: before the processor identifies, according to the biometric feature information, the user corresponding to the biometric feature information, receive voice information sent by a voice device bound with the first device; and the processor is configured to: identify, according to the biometric feature information sent by the first device and voiceprint feature information included in the voice information sent by the voice device, the user corresponding to the biometric feature information and a user corresponding to the voiceprint feature information; and when the user corresponding to the biometric feature information and the user corresponding to the voiceprint feature information are the same user, determine the same user as an identification result.

In some embodiments, the communication interface is further configured to: before the processor performs the operation for the user according to the body movement information, receive voice information sent by a voice device bound with the first device; and the processor is configured to: perform semantic recognition on the voice information; and perform the operation for the user according to the body movement information and semantics recognized from the voice information.

In some embodiments, the processor is further configured to return corresponding reply information to the voice device by using the communication interface according to the semantics recognized from the voice information, for the voice device to play the reply information.

In some embodiments, the processor is further configured to return response information to a display device bound with the first device by using the communication interface according to the received biometric feature information and/or body movement information, for the display device to display the response information.

In some embodiments, the communication interface is further configured to receive vital sign information sent by a vital sign detection device bound with the first device; and the processor is configured to: determine, according to the received vital sign information and a stored recommendation rule, information and/or an operation to be recommended to the user; and send the determined information and/or operation to the display device by using the communication interface for displaying.

In some embodiments, the communication interface is further configured to: before the processor identifies the user corresponding to the biometric feature information, receive biometric feature information acquired by a human body chip and/or a digital certificate stored in the human body chip that is sent by the first device; and the processor is configured to: identify a user corresponding to the biometric feature information acquired by the first device and a user corresponding to the biometric feature information acquired by the human body chip and/or the digital certificate stored in the human body chip; and when the user corresponding to the biometric feature information acquired by the first device and the user corresponding to the biometric feature information acquired by the human body chip and/or the digital certificate stored in the human body chip are the same user, determine the same user as an identification result.

Figure 11:
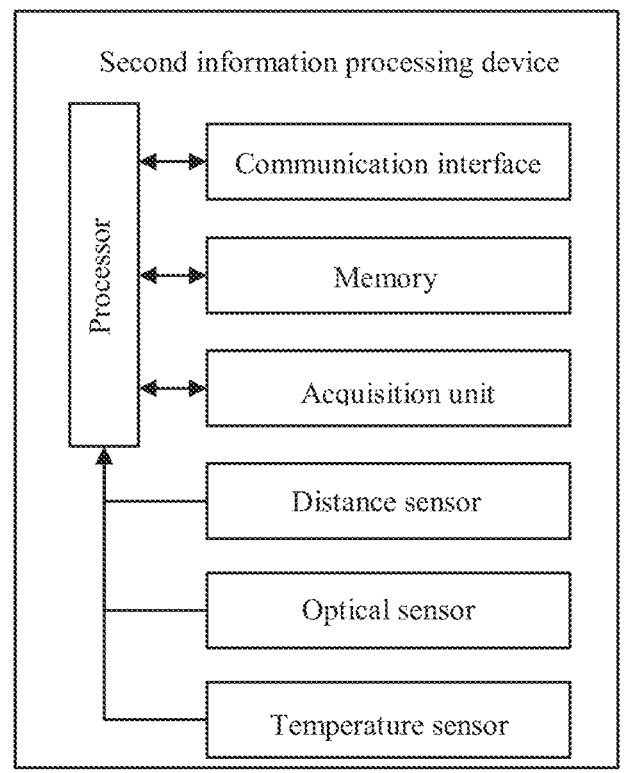
FIG. 11 shows a second information processing device according to an embodiment of the application.

FIG. 11 shows a second information processing device according to an embodiment of the application. The device is an Internet of Things device, but may not be a mobile terminal device. The device includes an acquisition unit, a processor, and a communication interface, where the processor is configured to: monitor whether a first acquisition instruction is triggered; when it is detected that the first acquisition instruction is triggered, control the acquisition unit to acquire biometric feature information, receive the biometric feature information acquired by the acquisition unit; and send the acquired biometric feature information to a server device by using the communication interface, for the server device to identify a user corresponding to the biometric feature information; the acquisition unit is configured to: acquire the biometric feature information, and return the biometric feature information to the processor; and the communication interface is configured to send the biometric feature information to the server device.

In some embodiments, the device further includes a distance sensor; the distance sensor is configured to: monitor a distance between an object and the device, and send the detected distance to the processor; and the processor is configured to: monitor, by using the distance sensor, whether there is an object whose distance to the device is less than a set distance; and if yes, determine that the first acquisition instruction is triggered.

In some embodiments, the device further includes an optical sensor; the optical sensor is configured to: monitor an intensity of illumination received by the device, and send the monitored intensity of illumination to the processor; and the processor is configured to: monitor, by using the optical sensor, whether the intensity of illumination received by the device is lower than an illumination intensity threshold; and if yes, determine that the first acquisition instruction is triggered.

In some embodiments, the device further includes a temperature sensor; the temperature sensor is configured to: monitor a temperature of an environment in which the device is located, and send the monitored temperature to the processor; and the processor is configured to: monitor, by using the temperature sensor, whether the temperature of the environment in which the device is located is higher than a temperature threshold; and if yes, determine that the first acquisition instruction is triggered.

In some embodiments, the device further includes a memory; the memory is configured to store registered user information; the communication interface is further configured to receive an identification result that is obtained by identifying, by the server device, the user according to the biometric feature information; and the processor is configured to: determine whether the identification result received by the communication interface is consistent with the registered user information prestored in the memory; and if yes, trigger a second acquisition instruction of a second device, for the second device to acquire body movement information, and send the body movement information to the server device; or if not, not trigger a second acquisition instruction of a second device.

In some embodiments, the processor is configured to: determine the second device having a binding relationship with the device; and trigger the second acquisition instruction of the determined second device.

In some embodiments, the communication interface is further configured to receive biometric feature information acquired by a human body chip and/or a digital certificate stored in the human body chip that is sent by the human body chip; and the processor is configured to send the biometric feature information acquired by the human body chip and/or the digital certificate stored in the human body chip that is received by the communication interface, to the server device by using the communication interface.

In some embodiments, the processor is configured to: when receiving, by using the communication interface, the biometric feature information acquired by the human body chip and/or the digital certificate stored in the human body chip, determine that the first acquisition instruction is triggered.

Figure 12:
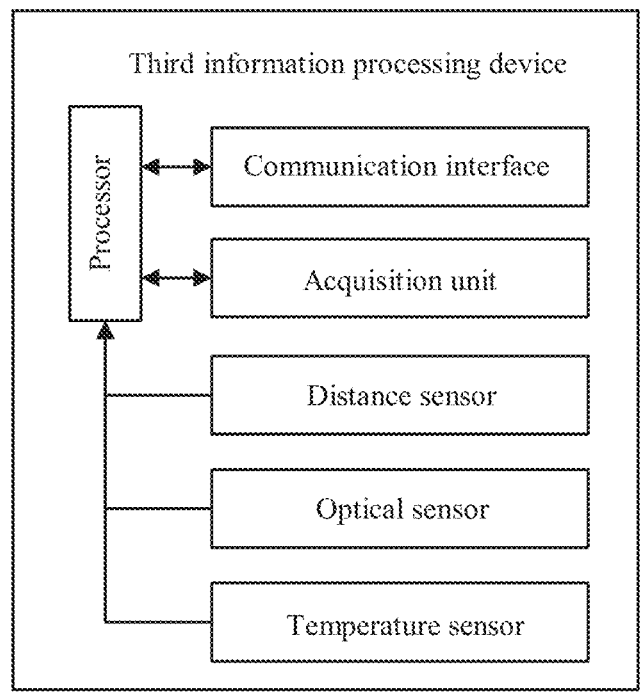
FIG. 12 shows a third information processing device according to an embodiment of the application.

FIG. 12 shows a third information processing device according to an embodiment of the application. The device is an Internet of Things device, and the device includes an acquisition unit, a processor, and a communication interface, where the processor is configured to: monitor whether a second acquisition instruction is triggered; when detecting that the second acquisition instruction is triggered, control the acquisition unit to acquire body movement information; and send the acquired body movement information to a server device by using the communication interface, for the server device to perform an operation for a user; the acquisition unit is configured to: acquire the body movement information, and send the acquired body movement information to the processor; and the communication interface is configured to send the body movement information to the server device.

In some embodiments, the communication interface is further configured to receive a triggering message sent by a first device or a triggering message sent by the server device; and the processor is configured to: when receiving, by using the communication interface, the triggering message sent by the first device or the triggering message sent by the server device, determine that the second acquisition instruction is triggered.

In some embodiments, the device further includes a distance sensor; the distance sensor is configured to: monitor a distance between an object and the device, and send the monitored distance to the processor; and the processor is configured to: monitor, by using the distance sensor, whether there is an object whose distance to the device is less than a set distance; and if yes, determine that the second acquisition instruction is triggered.

In some embodiments, the device further includes an optical sensor; the optical sensor is configured to: monitor an intensity of illumination received by the device, and send the monitored intensity of illumination to the processor; and the processor is configured to: monitor, by using the optical sensor, whether the intensity of illumination on the device is lower than an illumination intensity threshold; and if yes, determine that the second acquisition instruction is triggered.

In some embodiments, the device further includes a temperature sensor; the temperature sensor is configured to: monitor a temperature of an environment in which the device is located, and send the monitored temperature to the processor; and the processor is configured to: monitor, by using the temperature sensor, whether the temperature of the environment in which the device is located is higher than a temperature threshold; and if yes, determine that the second acquisition instruction is triggered.

Figure 13:
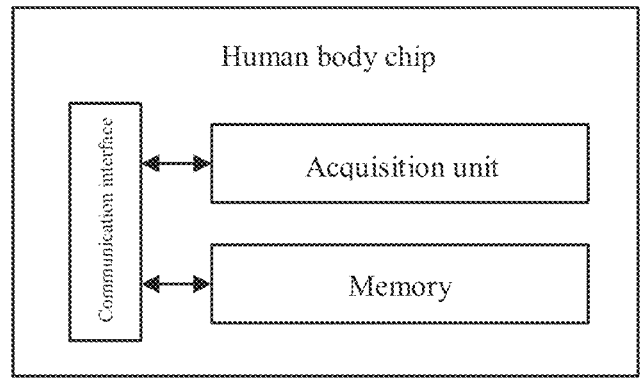
FIG. 13 shows a human body chip according to an embodiment of the application.

FIG. 13 shows a human body chip according to an embodiment of the application. The human body chip includes an acquisition unit, a memory, and a communication interface, where the acquisition unit is configured to acquire biometric feature information of a user; the memory is configured to store a digital certificate; and the communication interface is configured to: send the biometric feature information acquired by the acquisition unit and/or the digital certificate stored in the memory to the first device, for the first device to send biometric feature information acquired by the first device, and the biometric feature information acquired by the human body chip, and/or the digital certificate stored in the human body chip to a server device for identification.

In some embodiments, the communication interface is further configured to: receive response information sent by the server device; and send the response information to a display device for displaying.

In some embodiments, the human body chip is attached to skin of the user or is implanted in the skin; and the display device is a thin film display and is carried by the user.

In some embodiments, the communication interface is configured to send the response information to the display device for displaying, by using a human body to which the human body chip is attached or in which the human body chip is implanted as a transmission medium.

Figure 14:
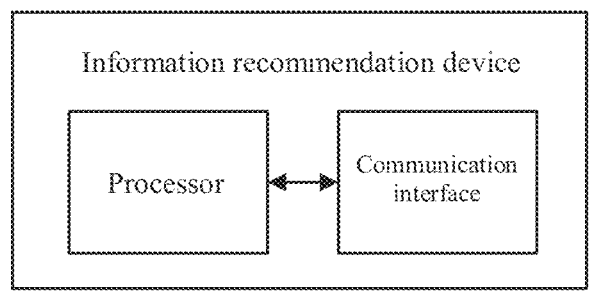
FIG. 14 shows an information recommendation device according to an embodiment of the application.

FIG. 14 shows an information recommendation device according to an embodiment of the application. The device includes a processor and a communication interface, where the processor is configured to: receive, by using the communication interface, biometric feature information sent by a first device and vital sign information sent by a vital sign detection device; identify, according to the biometric feature information, a user corresponding to the biometric feature information; determine, according to the vital sign information and a stored recommendation rule, information and/or an operation to be recommended to the user; and send the determined information and/or operation to a display device by using the communication interface for displaying; and the communication interface is configured to: receive the biometric feature information sent by the first device and the vital sign information sent by the vital sign detection device; and send the information and/or operation determined by the processor to the display device for displaying.

In some embodiments, the vital sign detection device is a human body chip; the communication interface is configured to receive biometric feature information acquired by the first device, and the vital sign information and biometric feature information acquired by the human body chip, and/or a digital certificate stored in the human body chip that are sent by the first device; and the processor is configured to identify the user according to the biometric feature information acquired by the first device, and the biometric feature information acquired by the human body chip and/or the digital certificate stored in the human body chip.

In some embodiments, the information to be recommended to the user includes product information; the communication interface is further configured to receive body movement information sent by a second device; and the processor is configured to: determine, according to the body movement information, product information selected by the user in all pieces of product information displayed on the display device; and perform an ordering operation and a payment operation for the user according to an account corresponding to the user and the product information selected by the user.

Figure 15:
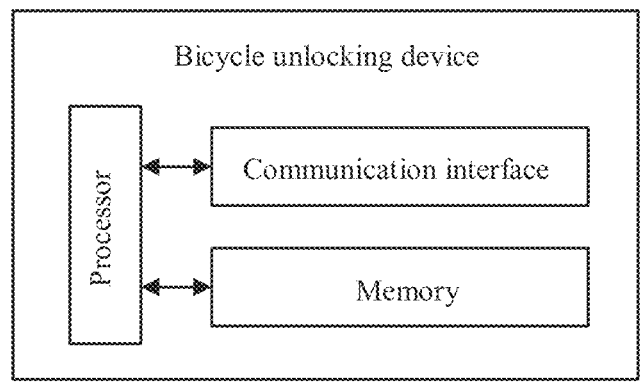
FIG. 15 shows a bicycle unlocking device according to an embodiment of the application.

FIG. 15 shows a bicycle unlocking device according to an embodiment of the application. The device includes a communication interface and a processor, where the processor is configured to: receive, by using the communication interface, biometric feature information acquired and sent by a first acquisition unit on a bicycle and body movement information acquired and sent by a second acquisition unit on the bicycle; identify, according to the biometric feature information sent by the first acquisition unit, a user corresponding to the biometric feature information; and when identifying, according to the body movement information, that the body movement information is a specified body movement, perform a payment operation according to an account corresponding to the user, and control to unlock a lock of the bicycle; and the communication interface is configured to receive the biometric feature information acquired and sent by the first acquisition unit on the bicycle and the body movement information acquired and sent by the second acquisition unit on the bicycle.

In some embodiments, the communication interface is configured to: receive the biometric feature information acquired and sent by the first acquisition unit on the bicycle; and receive biometric feature information acquired by a human body chip and/or a digital certificate stored in the human body chip that is sent by the first acquisition unit; and the processor is configured to: identify a user corresponding to the biometric feature information acquired by the first device and a user corresponding to the biometric feature information acquired by the human body chip and/or the digital certificate stored in the human body chip; and when the user corresponding to the biometric feature information acquired by the first device and the user corresponding to the biometric feature information acquired by the human body chip and/or the digital certificate stored in the human body chip are the same user, determine the same user as an identification result.

In some embodiments, the communication interface is further configured to receive vital sign information of the user that is detected by a vital sign detection component of the bicycle; and the processor is configured to: determine, according to the vital sign information, information to be recommended to the user, and send, by using the communication interface, the information to be recommended to the user to a display component of the bicycle for displaying.

In some embodiments, the information to be recommended to the user is product information; the device further includes a memory; the memory is configured to store an electronic map and information about an offline merchant; the communication interface is configured to receive information about a current geographical location of the bicycle that is sent by a positioning component on the bicycle; and the processor is configured to: determine information about an offline merchant according to the product information to be recommended to the user; determine a route from the current geographical location to the offline merchant according to the information about the current geographical location of the bicycle, and the electronic map and the information about the offline merchant that are stored in the memory; and send the route to the display component for displaying by using the communication interface.

Figure 16:
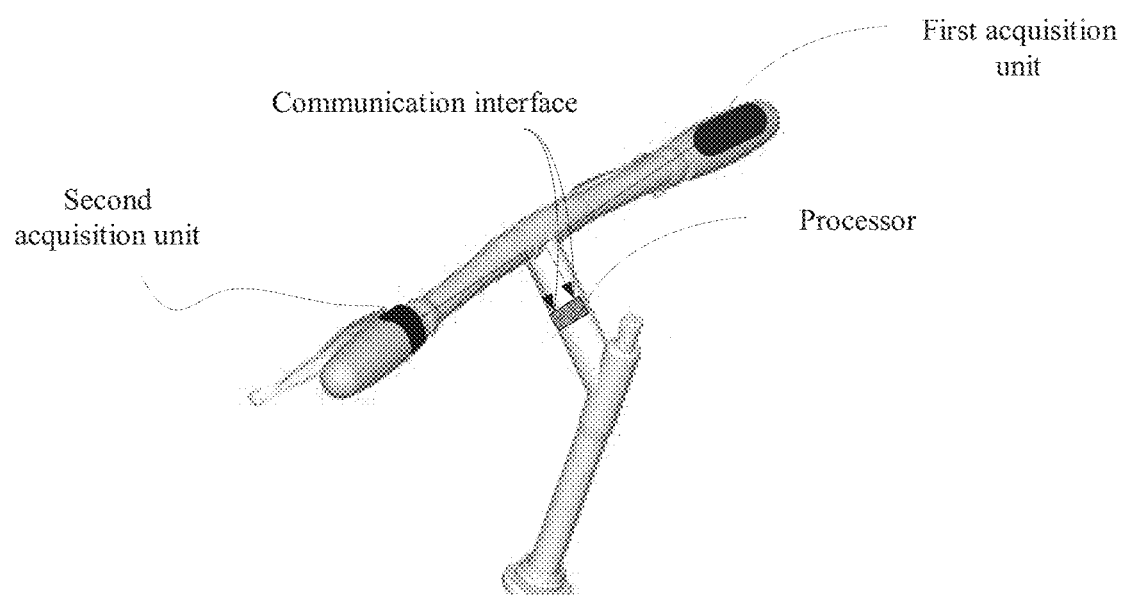
FIG. 16 shows a bicycle according to an embodiment of the application.

FIG. 16 shows a bicycle according to an embodiment of the application. The device includes a first acquisition unit, a second acquisition unit, a processor, a communication interface, and a lock, where the processor is configured to: when a first acquisition instruction is triggered, acquire biometric feature information by using the first acquisition unit, and send the biometric feature information to a server device by using the communication interface; when a second acquisition instruction is triggered, acquire body movement information by using the second acquisition unit, and send the body movement information to the server device by using the communication interface; and unlock the lock when receiving, by using the communication interface, an unlocking instruction returned by the server device; the first acquisition unit is configured to: acquire the biometric feature information, and send the acquired biometric feature information to the processor; the second acquisition unit is configured to: acquire the body movement information, and send the acquired body movement information to the processor; and the communication interface is configured to: send the biometric feature information to the server device, send the body movement information to the server device, and receive the unlocking instruction returned by the server device.

In some embodiments, the processor is configured to: when receiving, by using the communication interface, biometric feature information acquired by a human body chip and/or a digital certificate stored in the human body chip that is sent by the human body chip, determine that the first acquisition instruction is triggered; and the processor is further configured to send, by using the communication interface, the biometric feature information acquired by the first acquisition unit, and the biometric feature information acquired by the human body chip, and/or the digital certificate stored in the human body chip to the server device.

In some embodiments, the processor is configured to: when the first acquisition instruction is triggered, determine that the second acquisition instruction is triggered; or when receiving a triggering message sent after the first acquisition unit acquires the biometric feature information, determine that the second acquisition instruction is triggered; or after receiving a user corresponding to the biometric feature information that is identified by the server device, determine that the second acquisition instruction is triggered.

In some embodiments, the first acquisition unit is arranged on a handlebar, and the second acquisition unit is arranged on the handlebar.

In some embodiments, the bicycle further includes a vital sign detection component and a display component (both the vital sign detection component and the display component are not shown in FIG. 16); the vital sign detection component is configured to: monitor vital sign information of the user, and send the vital sign information to the processor; the processor is configured to: send the vital sign information to the server device by using the communication interface; receive, by using the communication interface, information to be recommended to the user and that is returned by the server device according to the vital sign information; and send the information to be recommended to the user to the display component for displaying; and the display component is configured to display the information to be recommended to the user and that is sent by the processor.

In some embodiments, the bicycle further includes a positioning component; the positioning component (the positioning component is not shown in FIG. 16) is configured to send information about a current geographical location of the bicycle to the server; the communication interface is configured to: receive a route from the current geographical location to an offline merchant that is sent by the server device, where the route is determined according to an electronic map stored in the server device, the information about the current geographical location of the bicycle, and information about the offline merchant, after the server device determines the information about the offline merchant according to the product information to be recommended to the user; and the processor is configured to send the route received by using the communication interface to the display component for displaying.

A person skilled in the art should understand that, the first acquisition unit and the second acquisition unit on the bicycle may be the same acquisition unit, or may be different acquisition units. In FIG. 16, an example in which the first acquisition unit and the second acquisition unit are the same acquisition unit is taken for description. FIG. 16 shows some components of the bicycle, and other components, such as a wheel, a frame, and a seat, of the bicycle are not shown in FIG. 16.

Figure 17:
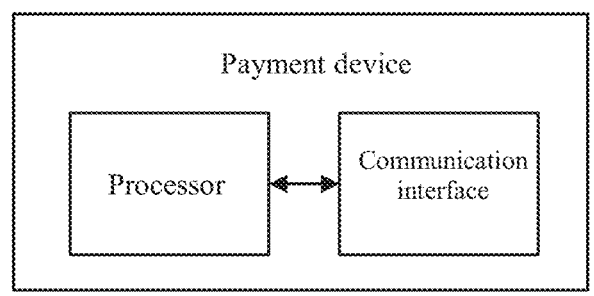
FIG. 17 shows a payment device according to an embodiment of the application.

FIG. 17 shows a payment device according to an embodiment of the application. The device includes a processor and a communication interface, where the processor is configured to: receive, by using the communication interface, biometric feature information acquired and sent by a first acquisition unit on a shelf of a shop and body movement information acquired and sent by a second acquisition unit on the shelf; identify, according to the biometric feature information sent by the first acquisition unit on the shelf, a user corresponding to the biometric feature information; identify, according to the body movement information, a product obtained by the user from the shelf, and record the product; and when receiving, by using the communication interface, biometric feature information acquired and sent by an exit device, identify, according to the biometric feature information sent by the exit device, a user who leaves the shop, and perform, according to the recorded product obtained by the user who leaves the shop, a payment operation for the user who leaves the shop; and the communication interface is configured to: receive the biometric feature information acquired and sent by the first acquisition unit on the shelf of the shop and the body movement information acquired and sent by the second acquisition unit on the shelf, and receive the biometric feature information acquired and sent by the exit device.

In some embodiments, the communication interface is further configured to receive biometric feature information acquired and sent by an entrance device of the shop; and the processor is configured to: identify, according to the biometric feature information acquired and sent by the entrance device, users who enter the shop; identify, according to the biometric feature information of the users who enter the shop and the biometric feature information sent by the first acquisition unit on the shelf, the user corresponding to the biometric feature information sent by the first acquisition unit on the shelf in the users who enter the shop; and identify, according to the biometric feature information of the users who enter the shop and the biometric feature information sent by the exit device, a user corresponding to the biometric feature information sent by the exit device in the users who enter the shop as the identified user who leaves the shop.

Figure 18:
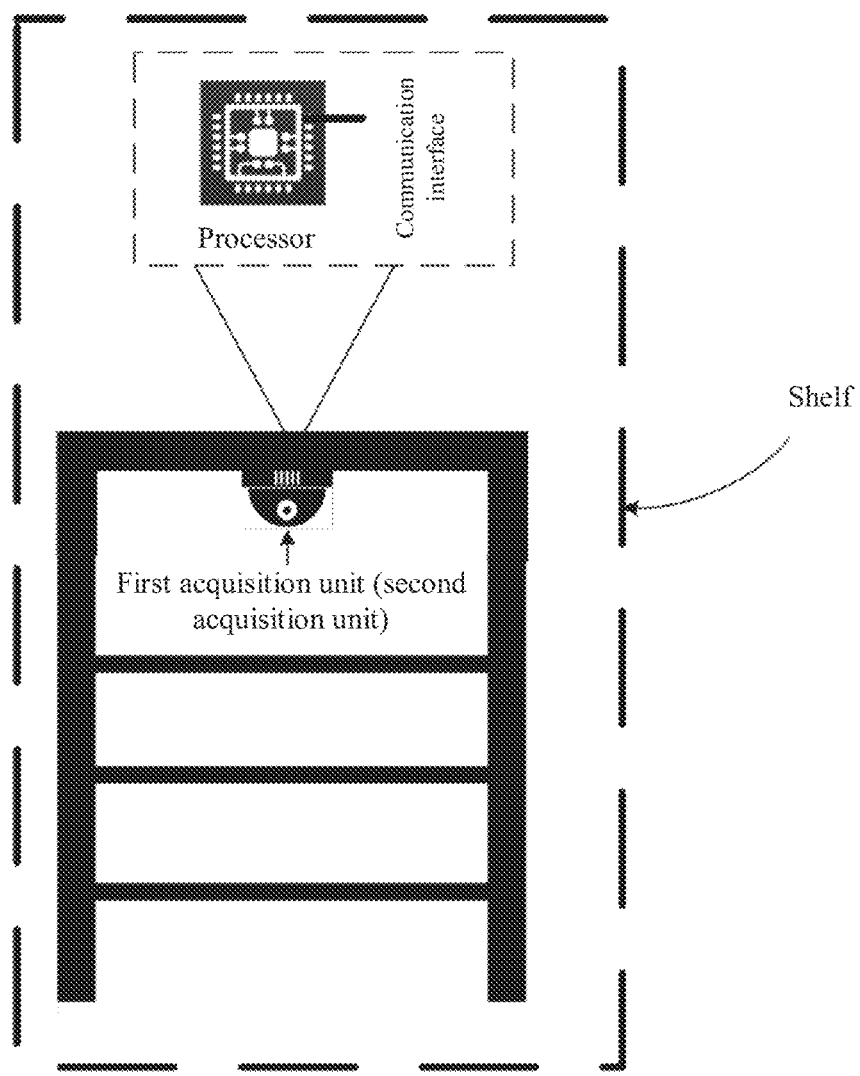
FIG. 18 shows a shelf according to an embodiment of the application.

FIG. 18 shows a shelf according to an embodiment of the application. The shelf includes a first acquisition unit, a second acquisition unit, a processor, and a communication interface, where the processor is configured to: when a first acquisition instruction is triggered, acquire biometric feature information by using the first acquisition unit; when a second acquisition instruction is triggered, acquire body movement information by using the second acquisition unit; and send, by using the communication interface, the biometric feature information and the body movement information to a server device, for the server device to identify a product obtained by a user corresponding to the biometric feature information from the shelf; the first acquisition unit is configured to: acquire the biometric feature information, and send the biometric feature information to the processor; the second acquisition unit is configured to: acquire the body movement information, and send the body movement information to the processor; and the communication interface is configured to: send the biometric feature information and the body movement information to the server device.

In some embodiments, the first acquisition unit is arranged on an outer surface of a body of the shelf; and the second acquisition unit is arranged on the outer surface of the body of the shelf.

A person skilled in the art should understand that, the first acquisition unit and the second acquisition unit on the shelf may be the same acquisition unit, or may be different acquisition units. In FIG. 18, an example in which the first acquisition unit and the second acquisition unit are the same acquisition unit is taken for description.

Figure 19:
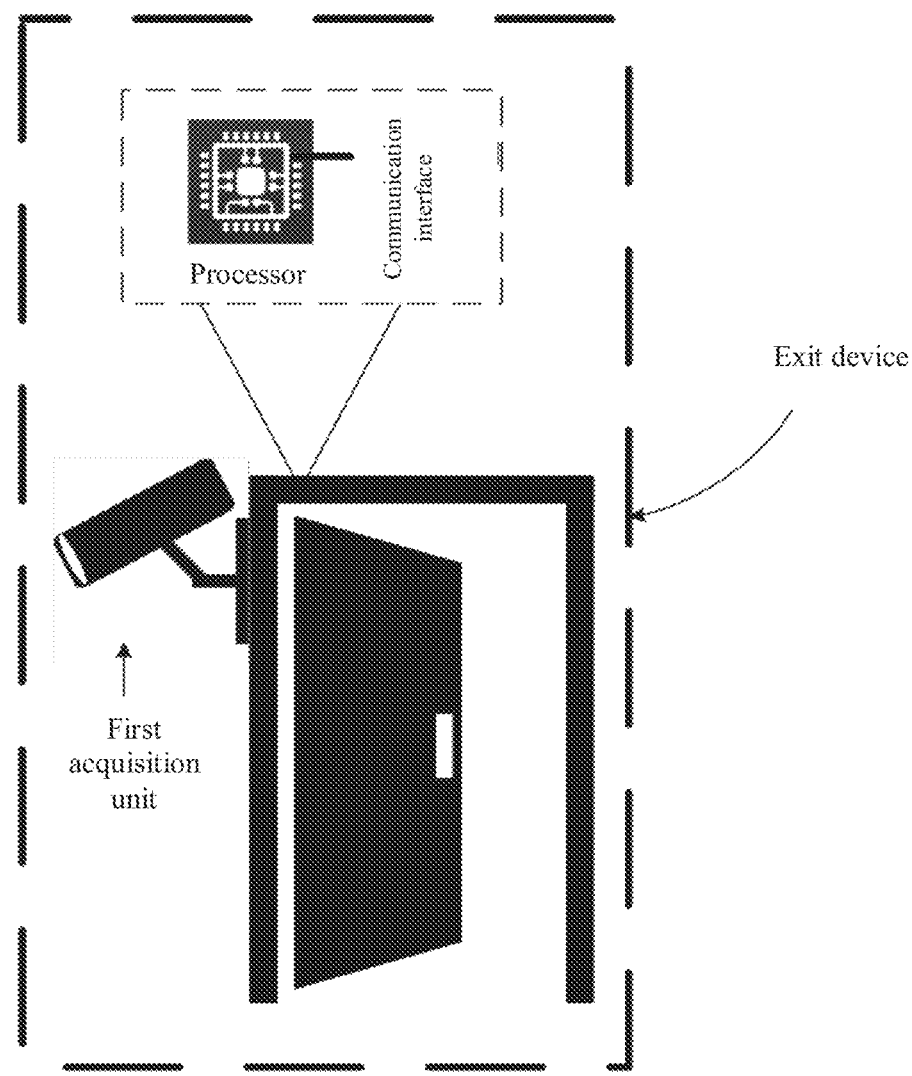
FIG. 19 shows an exit device according to an embodiment of the application.

FIG. 19 shows an exit device according to an embodiment of the application. The exit device includes a first acquisition unit, a processor, and a communication interface, where the processor is configured to: when a first acquisition instruction is triggered, acquire biometric feature information by using the first acquisition unit, and send the biometric feature information to a server device by using the communication interface, for the server device to identify, according to the biometric feature information, a user who leaves a shop, and performs, according to a recorded product obtained by the user who leaves the shop, a payment operation for the user who leaves the shop; the first acquisition unit is configured to: acquire the biometric feature information of the user, and send the biometric feature information to the processor; and the communication interface is configured to send the biometric feature information to the server device.

Figure 20:
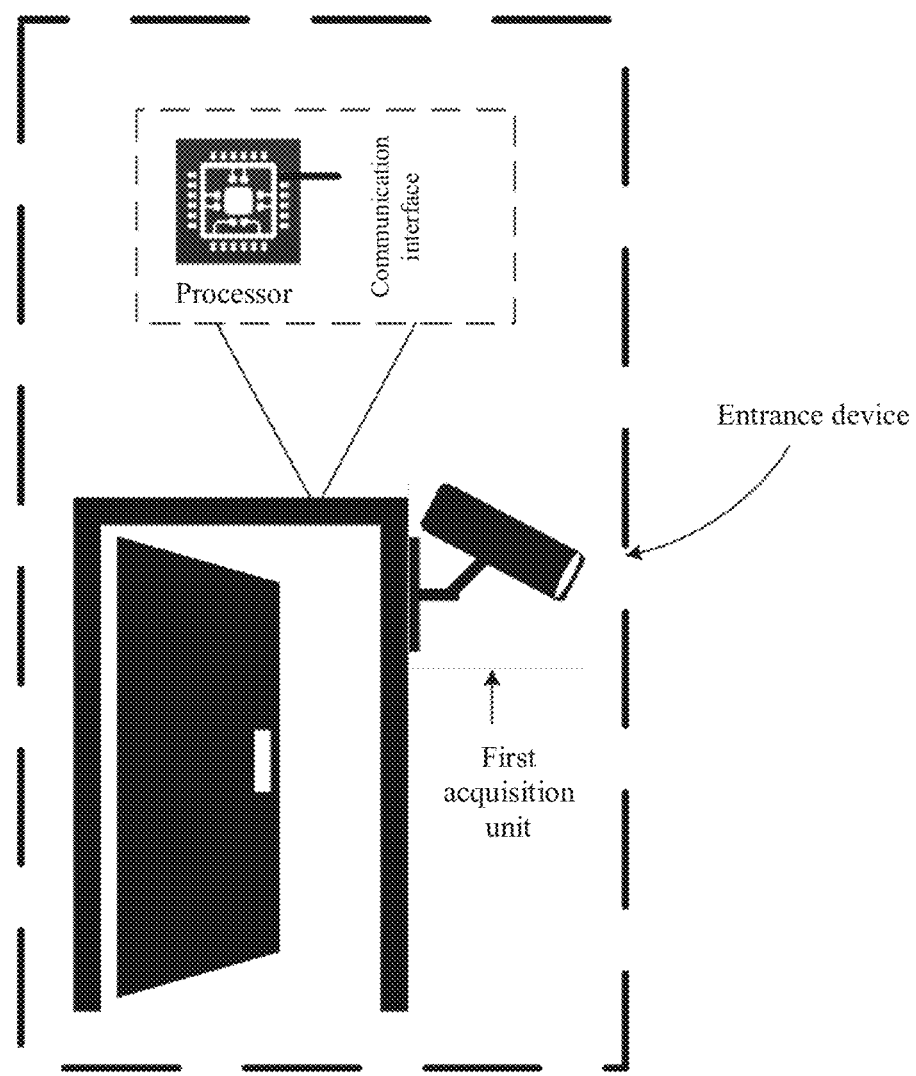
FIG. 20 shows an entrance device according to an embodiment of the application.

FIG. 20 shows an entrance device according to an embodiment of the application. The entrance device includes a first acquisition unit, a processor, and a communication interface, where the processor is configured to: when a first acquisition instruction is triggered, acquire biometric feature information by using the first acquisition unit, and send the biometric feature information to a server device by using the communication interface, for the server device to identify users who enter a shop; when receiving biometric feature information sent by a shelf, identify a user corresponding to the biometric feature information sent by the shelf in the users who enter the shop; and when receiving biometric feature information sent by an exit device, identify a user who leaves the shop in the users who enter the shop; the first acquisition unit is configured to: acquire the biometric feature information, and send the acquired biometric feature information to the processor; and the communication interface is configured to send the biometric feature information acquired by the first acquisition unit to the server device.

Figure 21:
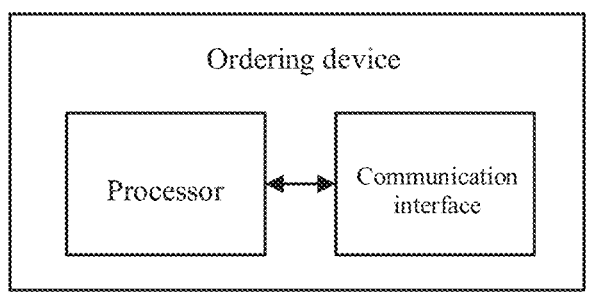
FIG. 21 shows an ordering device according to an embodiment of the application.

FIG. 21 shows an ordering device according to an embodiment of the application. The ordering device includes a communication interface and a processor, where the processor is configured to: receive, by using the communication interface, biometric feature information acquired and sent by a first acquisition unit on a dining table and body movement information acquired and sent by a second acquisition unit on the dining table; identify, according to the biometric feature information sent by the first acquisition unit, a user corresponding to the biometric feature information; identify, according to the body movement information, a dish selected by the user from dishes displayed on a display component on the dining table; and perform an ordering operation for the user according to the identified dish selected by the user; and the communication interface is configured to: receive the biometric feature information acquired and sent by the first acquisition unit on the dining table and the body movement information acquired and sent by the second acquisition unit on the dining table.

In some embodiments, the communication interface is further configured to receive biometric feature information acquired and sent by an entrance device; and the processor is configured to: identify, according to the biometric feature information acquired and sent by the entrance device, users who enter a restaurant; and identify, according to the biometric feature information of the users who enter the restaurant and the biometric feature information sent by the first acquisition unit on the dining table, the user corresponding to the biometric feature information sent by the first acquisition unit on the dining table in the users who enter the restaurant.

In some embodiments, the communication interface is further configured to receive biometric feature information acquired and sent by an exit device; and the processor is configured to: identify, according to the biometric feature information acquired and sent by the exit device, a user who leaves the restaurant; and perform, according to a dish ordered for the user who leaves the restaurant, a payment operation for the user who leaves the restaurant.

Figure 22:
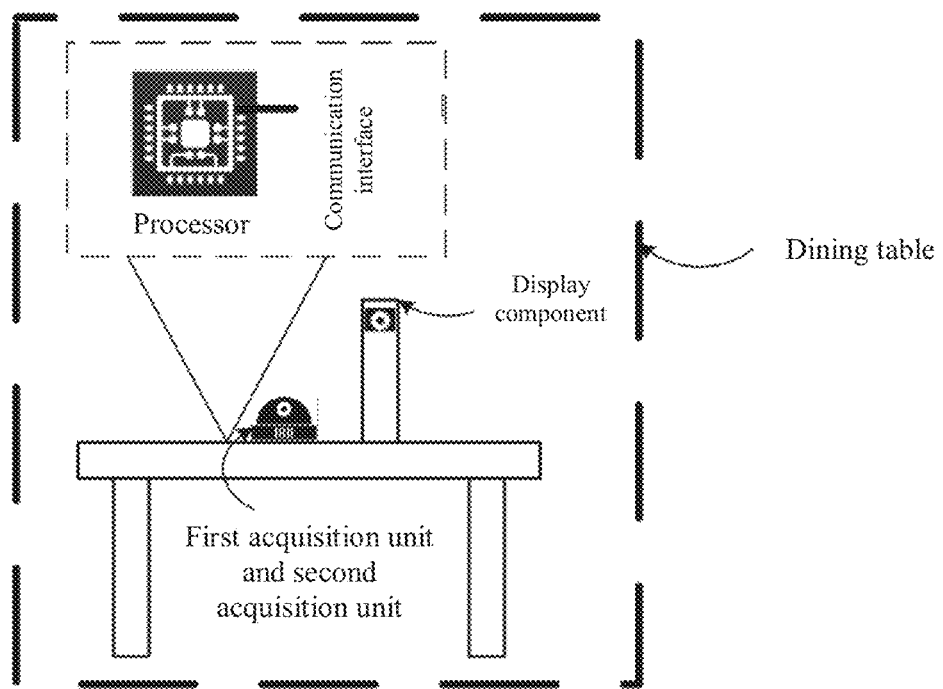
FIG. 22 shows a dining table according to an embodiment of the application.

FIG. 22 shows a dining table according to an embodiment of the application. The dining table includes a first acquisition unit, a second acquisition unit, a communication interface, a processor, and a display component, where the processor is configured to: when a first acquisition instruction is triggered, acquire biometric feature information by using the first acquisition unit, and send the biometric feature information to a server device by using the communication interface; when a second acquisition instruction is triggered, acquire body movement information by using the second acquisition unit, and send the body movement information to the server device by using the communication interface, for the server device to identify a dish selected by a user corresponding to the biometric feature information from dishes displayed on the display component on the dining table; the first acquisition unit is configured to: acquire the biometric feature information, and send the biometric feature information to the processor; the second acquisition unit is configured to: acquire the body movement information, and send the body movement information to the processor; the communication interface is configured to send the biometric feature information to the server device, and send the body movement information to the server device; and the display component is configured to display the dishes.

In some embodiments, the first acquisition unit is arranged on a tabletop of the dining table; the second acquisition unit is arranged on the tabletop of the dining table; and the display component is arranged on the tabletop of the dining table.

In some embodiments, the display component is a display component having a holographic projection function; and the display component is configured to display dishes through holographic projection.

A person skilled in the art should understand that, the first acquisition unit and the second acquisition unit on the dining table may be the same acquisition unit, or may be different acquisition units. In FIG. 22, an example in which the first acquisition unit and the second acquisition unit are the same acquisition unit is taken for description.

Figure 23:
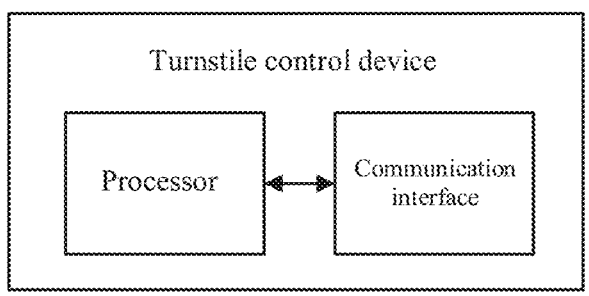
FIG. 23 shows a turnstile control device according to an embodiment of the application.

FIG. 23 shows a turnstile control device according to an embodiment of the application. The device includes a communication interface and a processor, where the processor is configured to: receive, by using the communication interface, biometric feature information acquired and sent by a first acquisition unit on a turnstile and first body movement information acquired and sent by a second acquisition unit on the turnstile; identify, according to the biometric feature information sent by the first acquisition unit, a user corresponding to the biometric feature information; when detecting, according to the first body movement information sent by the second acquisition unit, that a first body movement of the user satisfies a specified condition, determine whether there is a ticket purchase record of the user; and if yes, send an opening instruction to the turnstile by using the communication interface; or if not, not send an opening instruction; and the communication interface is configured to: receive the biometric feature information acquired and sent by the first acquisition unit on the turnstile and the first body movement information acquired and sent by the second acquisition unit on the turnstile; and send the opening instruction to the turnstile.

In some embodiments, the communication interface is further configured to: after sending the opening instruction, receive second body movement information sent by the second acquisition unit on the turnstile; and the processor is configured to: when identifying, according to the second body movement information, that the user has passed through the turnstile, delete the ticket purchase record of the user.

Figure 24:
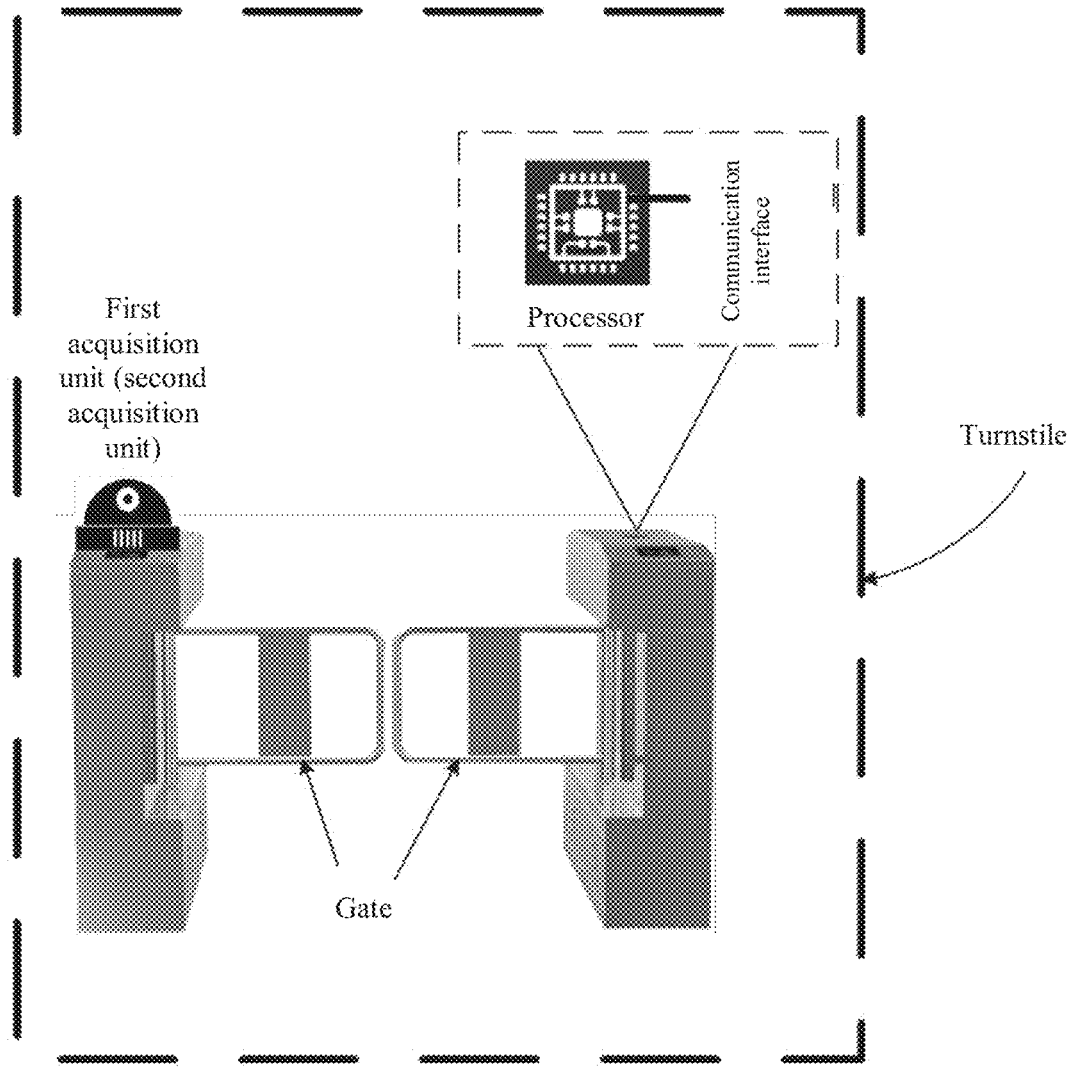
FIG. 24 shows a turnstile according to an embodiment of the application.

FIG. 24 shows a turnstile according to an embodiment of the application. The turnstile includes a first acquisition unit, a second acquisition unit, a communication interface, a processor, and a gate, where the processor is configured to: when a first acquisition instruction is triggered, acquire biometric feature information by using the first acquisition unit, and send the biometric feature information to a server device by using the communication interface; when a second acquisition instruction is triggered, acquire first body movement information by using the second acquisition unit, and send the first body movement information to the server device by using the communication interface; for the server to identify a user corresponding to the biometric feature information; when detecting that a first body movement of the user satisfies a specified condition, determine whether there is a ticket purchase record of the user; and if yes, return an opening instruction; or if not, not return an opening instruction; the processor is configured to: when receiving the opening instruction by using the communication interface, control the gate to be open; the first acquisition unit is configured to: acquire the biometric feature information, and send the biometric feature information to the processor; the second acquisition unit is configured to: acquire the body movement information, and send the body movement information to the processor; and the communication interface is configured to: send the biometric feature information to the server device, send the first body movement information to the server device, receive the opening instruction returned by the server, and send the opening instruction to the processor.

In some embodiments, the processor is further configured to: after controlling, according to the opening instruction, the gate to be open, acquire, by using the second acquisition unit, second body movement information, and send the second body movement information to the server device by using the communication interface, for the server device to delete the ticket purchase record of the user after identifying that the user has passed through the turnstile.

A person skilled in the art should understand that, the first acquisition unit and the second acquisition unit on the turnstile may be the same acquisition unit, or may be different acquisition units. In FIG. 24, an example in which the first acquisition unit and the second acquisition unit are the same acquisition unit is taken for description.

Figure 25:
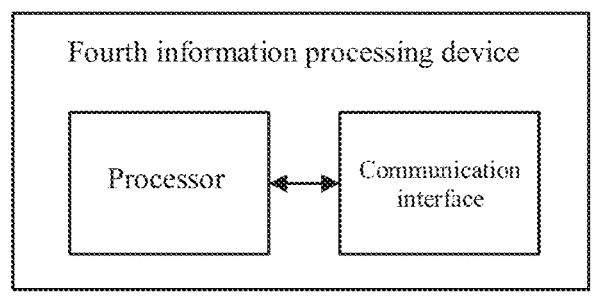
FIG. 25 shows a fourth information processing device according to an embodiment of the application.

FIG. 25 shows a fourth information processing device according to an embodiment of the application. The device includes a communication interface and a processor, where the processor is configured to: receive, by using the communication interface, biometric feature information sent by a first device; identify, according to the biometric feature information, a user corresponding to the biometric feature information; and perform an operation for the user, where the first device is an Internet of Things device; and the communication interface is configured to: receive the biometric feature information sent by the first device, and send the biometric feature information to the processor.

In some embodiments, the processor is configured to: when identifying that the user is an authorized user, perform an operation for the user; or when identifying that the user is an authorized user, send an operation execution instruction to the first device by using the communication interface, for the first device to perform the operation for the user; and the communication interface is configured to send the operation execution instruction to the first device.

In some embodiments, the processor is configured to perform, according to a stored operation corresponding to the first device, the operation corresponding to the first device for the user. In some embodiments, the operation includes a payment operation.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure into a hardware circuit, to obtain a corresponding hardware circuit structure. Therefore, it does not mean that the improvement of a method procedure cannot be implemented by using a hardware entity module. For example, a programmable logic device (PLD) such as a field programmable turnstile array (FPGA) is a type of integrated circuit whose logic function is determined by a user by programming the device. The designers perform programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner. For example, the controller can take the form of, for example, a microprocessor or processor and a computer-readable medium storing computer-readable program code (for example, software or firmware) executable by the processor, a logic turnstile, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same functions. Such a controller can thus be considered as a hardware component and devices included therein for implementing various functions can also be considered as structures inside the hardware component. Alternatively, devices configured to implement various functions can be considered as both software modules implementing the method and structures inside the hardware component.

The system, the device, the module or the unit described in the foregoing embodiments can be specifically implemented by a computer chip or an entity or implemented by a product having a particular function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the device is described, the device is divided into units according to functions, which are separately described. Certainly, during implementation of the application, the functions of the units may be implemented in the same piece of or a plurality of pieces of software and/or hardware.

A person skilled in the art should understand that the embodiments of the application may be provided as a method, a system, or a computer program product. Therefore, the application may be in a form of complete hardware embodiments, complete software embodiments, or combination of software and hardware. Moreover, the application may use a form of a computer program product that is implemented on one or more computer-usable storage media (including but not limited to a disk memory, a CD-ROM, an optical memory, and the like) that include computer-usable program code.

The application is described with reference to the flowcharts and/or block diagrams of the method, the device (system), and the computer program product according to the embodiments of the application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate a device for implementing a function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction device. The instruction device implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computer device includes one or more processors (CPUs), an input/output interface, a network interface, and a memory.

The memory may include, among computer readable media, a volatile memory such as a random access memory (RAM) and/or a non-volatile memory such as a read-only memory (ROM) or a flash memory (flash RAM). The memory is an example of the computer-readable medium.

The computer-readable medium includes non-volatile, volatile, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should be noted that, the terms "include," "comprise," or their any other variant is intended to cover a non-exclusive inclusion, so that a process, a method, a product, or a device that includes a series of elements not only includes such elements, but also includes other elements not expressly listed, or further includes elements inherent to such a process, method, product, or device. Unless otherwise specified, an element limited by "include a/an . . ." does not exclude other same elements existing in the process, the method, the product, or the device that includes the elements.

A person skilled in the art should understand that the embodiments of the application may be provided as a method, a system, or a computer program product. Therefore, the application may use the form of hardware embodiments, software embodiments, or embodiments combining software and hardware. Moreover, the application may use a form of a computer program product that is implemented on one or more computer-usable storage media (including but not limited to a disk memory, a CD-ROM, an optical memory, and the like) that include computer-usable program code.

The application can be described in the general context of computer executable instructions executed by a computer, for example, a program module. Generally, the program module includes a routine, a program, an object, a component, a data structure, and the like for executing a particular task or implementing a particular abstract data type. The application may also be practiced in distributed computing environments in which tasks are performed by remote processing devices that are connected by using a communications network. In a distributed computing environment, the program module may be located in both local and remote computer storage media including storage devices.

The embodiments of the present disclosure are described in a progressive manner. For same or similar parts in the embodiments, refer to these embodiments. Each embodiment focuses on a difference from other embodiments. Especially, a system embodiment is basically similar to a method embodiment, and therefore is described briefly; for related parts, refer to partial descriptions in the method embodiment.

The foregoing descriptions are merely embodiments of the application, and are not intended to limit the application. For a person skilled in the art, various modifications and changes may be made to the application. Any modifications, equivalent replacements, improvements, and the like made within the spirit and principle of the application shall fall within the scope of the claims of the application.

What is claimed is:

1. An information processing method, comprising:
receiving, by a computer device, biometric feature information from a first Internet of Things (IoT) device, wherein the first IoT device includes a distance sensor, an optical sensor, and a biometric feature sensor, wherein the distance sensor is configured to detect whether a distance between an object and the first IoT device is less than a predetermined distance, and the optical sensor is configured to detect whether an intensity of illumination received by the optical sensor is lower than an illumination intensity threshold, and in response to detecting that the distance between the object and the first IoT device is less than the predetermined distance and that the intensity of illumination received by the optical sensor is lower than the illumination intensity threshold, the first IoT device activates the biometric feature sensor to acquire the biometric feature information;
identifying, by the computer device according to the biometric feature information, a user corresponding to the biometric feature information;
in response to identifying the user corresponding to the biometric feature information, sending, by the computer device, an identifying result to the first IoT device to enable the first IoT device to send a triggering message to a second IoT device to trigger the second IoT device to acquire body movement information associated with the user;

receiving, by the computer device, the body movement information associated with the user from the second IoT device; and performing, by the computer device, an operation for the user according to the body movement information.

2. The method according to claim 1, wherein the performing an operation for the user according to the body movement information comprises:

determining, according to a prestored correspondence between the second IoT device and body movement information, pieces of body movement information corresponding to the second IoT device;

determining the received body movement information matches a piece of body movement information in the determined pieces of body movement information; and performing, according to a prestored correspondence for the second IoT device and between the pieces of body movement information and operations, an operation corresponding to the piece of body movement information that matches the received body movement information for the user.

3. The method according to claim 1, further comprising:

determining, according to the identified user, whether the user is an authorized user; and in response to determining that the user is an authorized user, triggering a second acquisition instruction of the second IoT device, for the second IoT device to acquire the body movement information.

4. The method according to claim 1, wherein the user is a first user, the method further comprising:

receiving voice information from a voice device bound with the first IoT device, wherein the voice device is an IoT device;

identifying, according to voiceprint feature information included in the voice information from the voice device, a second user corresponding to the voiceprint feature information wherein the voiceprint feature information is different from the biometric feature information; and in response to detecting that the first user corresponding to the biometric feature information and the second user corresponding to the voiceprint feature information are a same user, determining the same user as the identification result.

5. The method according to claim 1, further comprising:

receiving voice information from a voice device bound with the first IoT device;

recognizing semantics in the voice information; and performing the operation for the user according to the body movement information and the semantics.

6. The method according to claim 1, further comprising:

receiving vital sign information from a vital sign detection device bound with the first IoT device;

determining information or an operation to be recommended to the user according to the received vital sign information and a stored recommendation rule; and sending the determined information or the operation to be recommended to the user to a display device for displaying.

7. The method according to claim 1, wherein the biometric feature information is first biometric feature information and the user is a first user, the method further comprising:

receiving, by the computer device from the first IoT device, second biometric feature information acquired by a human body chip and/or a digital certificate stored in the human body chip, wherein the human body chip is configured to communicate the second biometric feature information and/or the digital certificate to the first IoT device;

identifying, by the computer device, a second user corresponding to the second biometric feature information acquired by the human body chip and/or the digital certificate; and in response to detecting that the first user corresponding to the first biometric feature information acquired by the first IoT device and the second user corresponding to the second biometric feature information acquired by the human body chip and/or the digital certificate stored in the human body chip are a same user, determining, by the computer device, the same user as the identification result.

8. An information processing server, comprising one or more processors and one or more non-transitory computer-readable memories coupled to the one or more processors and configured with instructions executable by the one or more processors to cause the server to perform:

receiving biometric feature information from a first Internet of Things (IoT) device, wherein the first IoT device includes a distance sensor, an optical sensor, and a biometric feature sensor, wherein the distance sensor is configured to detect whether a distance between an object and the first IoT device is less than a predetermined distance, and the optical sensor is configured to detect whether an intensity of illumination received by the optical sensor is lower than an illumination intensity threshold, and in response to detecting that the distance between the object and the first IoT device is less than the predetermined distance and that the intensity of illumination received by the optical sensor is lower than the illumination intensity threshold, the first IoT device activates the biometric feature sensor to acquire the biometric feature information;

identifying, according to the biometric feature information, a user corresponding to the biometric feature information;

in response to identifying the user corresponding to the biometric feature information, sending an identifying result to the first IoT device to enable the first IoT device to send a triggering message to a second IoT device to trigger the second IoT device to acquire body movement information associated with the user;

receiving the body movement information associated with the user from the second IoT device; and performing an operation for the user according to the body movement information.

9. The server according to claim 8, wherein the first IoT device and the second IoT device have a binding relationship; and wherein the one or more non-transitory computer-readable memories coupled to the one or more processors and configured with instructions executable by the one or more processors to cause the server to further perform:

after identifying the user according to the biometric feature information, determining, according to an identification result, whether to trigger a second acquisition instruction of the second IoT device.

10. The server according to claim 8, wherein the one or more non-transitory computer-readable memories coupled to the one or more processors and configured with instructions executable by the one or more processors to cause the server to further perform:

receiving voice information from a voice device, wherein the voice device is an IoT device; and identifying the user according to the biometric feature information and voiceprint feature information included in the voice information.

11. The server according to claim 8, wherein the one or more non-transitory computer-readable memories coupled to the one or more processors and configured with instructions executable by the one or more processors to cause the server to further perform:
receiving voice information from a voice device, wherein the voice device is an IoT device;
recognizing semantics in the voice information; and
performing the operation for the user according to the body movement information and the semantics.

12. The server according to claim 11, wherein the one or more non-transitory computer-readable memories coupled to the one or more processors and configured with instructions executable by the one or more processors to cause the server to further perform:
returning corresponding reply information to the voice device according to the semantics, for the voice device to play the reply information to the user.

13. The server according to claim 8, wherein the one or more non-transitory computer-readable memories coupled to the one or more processors and configured with instructions executable by the one or more processors to cause the server to further perform:
returning response information to a display device according to the biometric feature information and/or the body movement information, for the display device to display the response information.

14. The server according to claim 13, wherein the one or more non-transitory computer-readable memories coupled to the one or more processors and configured with instructions executable by the one or more processors to cause the server to further perform:
receiving vital sign information from a vital sign detection device;
determining information or an operation to be recommended to the user according to the vital sign information and a recommendation rule; and
sending the determined information or the operation to be recommended to the user to the display device for displaying.

15. The server according to claim 8, wherein the one or more non-transitory computer-readable memories coupled to the one or more processors and configured with instructions executable by the one or more processors to cause the server to further perform:
identifying the user according to (i) the biometric feature information acquired by the first IoT device, and (ii) biometric feature information acquired by a human body chip and/or a digital certificate stored in the human body chip, wherein the digital certificate uniquely corresponds to the user.

16. One or more non-transitory computer-readable storage media storing instructions executable by one or more processors to cause the one or more processors to perform operations comprising:
receiving biometric feature information from a first Internet of Things (IoT) device, wherein the first IoT device includes a distance sensor, an optical sensor, and a biometric feature sensor, wherein the distance sensor is configured to detect whether a distance between an object and the first IoT device is less than a predetermined distance, and the optical sensor is configured to detect whether an intensity of illumination received by the optical sensor is lower than an illumination intensity threshold, and in response to detecting that the distance between the object and the first IoT device is less than the predetermined distance and that the intensity of illumination received by the optical sensor is lower than the illumination intensity threshold, the first IoT device activates the biometric feature sensor to acquire the biometric feature information;
identifying, according to the biometric feature information, a user corresponding to the biometric feature information;
in response to identifying the user corresponding to the biometric feature information, sending an identifying result to the first IoT device to enable the first IoT device to send a triggering message to a second IoT device to trigger the second IoT device to acquire body movement information associated with the user;
receiving the body movement information associated with the user from the second IoT device; and
performing an operation for the user according to the body movement information.

17. The one or more non-transitory computer-readable storage media according to claim 16, wherein the user is a first user, and the operations further comprise:
receiving voice information from a voice device bound with the first IoT device, wherein the voice device is an IoT device;
identifying, according to voiceprint feature information included in the voice information from the voice device, a second user corresponding to the voiceprint feature information, wherein the voiceprint feature information is different from the biometric feature information; and
in response to detecting that the first user corresponding to the biometric feature information and the second user corresponding to the voiceprint feature information are a same user, determining the same user as the identification result.

18. The one or more non-transitory computer-readable storage media according to claim 16, wherein the operations further comprise:
receiving vital sign information from a vital sign detection device bound with the first IoT device;
determining information or an operation to be recommended to the user according to the received vital sign information and a stored recommendation rule; and
sending the determined information or the operation to be recommended to the user to a display device for displaying.

* * * * *